United States Patent
Wu et al.

(10) Patent No.: US 10,225,126 B2
(45) Date of Patent: Mar. 5, 2019

(54) SYNCHRONIZATION METHOD, RECEIVE END, AND TRANSMIT END

(71) Applicant: Huawei Technologies Co., Ltd., Shenzhen (CN)

(72) Inventors: Yiling Wu, Beijing (CN); Tong Ji, Beijing (CN); Zhiqin Yu, Shenzhen (CN); Weiliang Zhang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 226 days.

(21) Appl. No.: 15/266,794

(22) Filed: Sep. 15, 2016

(65) Prior Publication Data
US 2017/0005851 A1    Jan. 5, 2017

Related U.S. Application Data

(63) Continuation of application No. PCT/CN2014/073520, filed on Mar. 17, 2014.

(51) Int. Cl.
*H04L 27/26* (2006.01)

(52) U.S. Cl.
CPC ...... *H04L 27/2692* (2013.01); *H04L 27/2657* (2013.01)

(58) Field of Classification Search
CPC .................................................. H04L 27/2692
See application file for complete search history.

(56) References Cited

U.S. PATENT DOCUMENTS

| 6,560,303 B1* | 5/2003 | Fan | H04L 7/042 370/509 |
| 2003/0016770 A1* | 1/2003 | Trans | H04B 1/00 375/346 |

(Continued)

FOREIGN PATENT DOCUMENTS

| CN | 101479951 A | 7/2009 |
| CN | 101682448 A | 3/2010 |

(Continued)

OTHER PUBLICATIONS

Sun et al., "Synchronization for OFDM-Based Systems," Recent Advances in Wireless Communications and Networks, XP55089606A, pp. 23-41, InTech (Aug. 2011).

(Continued)

*Primary Examiner* — Raj Jain
*Assistant Examiner* — Andrew C Lee
(74) *Attorney, Agent, or Firm* — Leydig, Voit & Mayer, Ltd.

(57) ABSTRACT

The present invention provides a synchronization signal receiving method, including: receiving, by a receive end, a synchronization sequence sent by a transmit end, where the synchronization sequence includes a carrier frequency synchronization sequence, the carrier frequency synchronization sequence is $zc(m) = e^{\pm j\pi m(m+1+2q)/L}$, $m = 0, 1, \ldots, L-1$, $q \in Z$, L indicates a length of the carrier frequency synchronization sequence, q indicates a parameter of the carrier frequency synchronization sequence, Z indicates an integer set, $e^{\pm j\pi m(m+1+2q)/L}$ indicates the $(\pm j\pi m(m+1+2q)/L)^{th}$ power of e, and e is a natural constant; and performing, by the receive end, frequency offset estimation according to the received synchronization sequence, to obtain a frequency offset estimation value. With the technical solutions of (Continued)

embodiments of the present invention, accuracy of frequency offset estimation can be improved.

20 Claims, 5 Drawing Sheets

(56) References Cited

U.S. PATENT DOCUMENTS

| | | | |
|---|---|---|---|
| 2004/0014494 A1* | 1/2004 | Hellhake | H04W 92/20 455/555 |
| 2004/0076246 A1* | 4/2004 | Vanderperren | H04L 27/2657 375/343 |
| 2007/0253465 A1* | 11/2007 | Muharemovic | H04L 5/0007 375/130 |
| 2008/0168114 A1* | 7/2008 | Han | H04J 13/0062 708/209 |
| 2008/0317184 A1* | 12/2008 | Zhang | H04H 20/95 375/367 |
| 2010/0086082 A1* | 4/2010 | Ogawa | H04J 13/0003 375/308 |
| 2011/0013720 A1 | 1/2011 | Lee et al. | |
| 2011/0026649 A1 | 2/2011 | Lipka et al. | |

FOREIGN PATENT DOCUMENTS

| | | |
|---|---|---|
| CN | 102413079 A | 4/2012 |
| CN | 103081425 A | 5/2013 |
| WO | WO 2012027880 A1 | 3/2012 |

OTHER PUBLICATIONS

"3$^{rd}$ Generation Partnership Project; Technical Specification Group Radio Access Network; Evolved Universal Terrestrial Radio Access (E-UTRA); Physical Channels and Modulation (Release 8)," 3GPP TS 36.211, V8.3.0, pp. 1-77, 3$^{rd}$ Generation Partnership Project, Valbonne, France (May 2008).

* cited by examiner

SYNCHRONIZATION METHOD, RECEIVE END, AND TRANSMIT END

CROSS-REFERENCE TO RELATED APPLICATIONS

This application is a continuation of International Application No. PCT/CN2014/073520, filed on Mar. 17, 2014, the disclosure of which is hereby incorporated by reference in its entirety.

TECHNICAL FIELD

Embodiments of the present invention relate to communications technologies, and in particular, to a synchronization method, a receive end, and a transmit end.

BACKGROUND

As machine-to-machine (M2M for short) communication applications increase rapidly, market demands and scale of the machine-to-machine communication applications have met explosive growth in recent years. Because the M2M applications have a requirement for low costs, a crystal oscillator of user equipment is relatively rough, and consequently, a system carrier frequency offset caused by the crystal oscillator is relatively high. The M2M applications may also need to support an application scenario with mobility of user equipment. In a scenario with high mobility, a Doppler frequency shift is relatively significant, which greatly affects an existing carrier frequency offset estimation method. In addition, because the M2M applications have a requirement for low power consumption, a channel transmission bandwidth is low, and a signal transmission power is also low. Therefore, reducing uplink and downlink channel transmission bandwidths is a relatively effective technical method for reducing power consumption. However, in a narrowband system, because a system symbol rate is low, an estimation range of the existing carrier frequency offset estimation method is small, and when the estimation range of the method is exceeded, a frequency offset estimation value is inaccurate.

SUMMARY

Embodiments of the present invention provide a synchronization method, a receive end, and a transmit end to resolve a problem in the prior art that a frequency offset estimation value is inaccurate.

According to a first aspect of the present embodiments, a synchronization signal receiving method is provided, including:

receiving, by a receive end, a synchronization sequence sent by a transmit end, where the synchronization sequence includes a carrier frequency synchronization sequence, the carrier frequency synchronization sequence is $zc(m) = e^{\pm j\pi m(m+1+2q)/L}$, $m = 0, 1, \ldots, L-1$, $q \in Z$, L L indicates a length of the carrier frequency synchronization sequence, q indicates a parameter of the carrier frequency synchronization sequence, Z indicates an integer set, $e^{\pm j\pi m(m+1+2q)/L}$ indicates the $(\pm j\pi m(m+1+2q)/L)^{th}$ power of e, and e is a natural constant; and performing, by the receive end, frequency offset estimation according to the received synchronization sequence, to obtain a frequency offset estimation value.

According to the first aspect, in a first possible implementation manner, the performing, by the receive end, frequency offset estimation according to the received synchronization sequence, to obtain a frequency offset estimation value includes:

determining, by the receive end, a start location of the received carrier frequency synchronization sequence according to the received synchronization sequence;

determining, by the receive end, a decimal part estimation value of the frequency offset estimation value according to the received carrier frequency synchronization sequence, the start location of the received carrier frequency synchronization sequence, and a local carrier frequency synchronization sequence;

performing, by the receive end, frequency compensation on the received carrier frequency synchronization sequence according to the decimal part estimation value, to obtain a first compensation sequence; and obtaining, by the receive end, an integer part estimation value of the frequency offset estimation value according to the first compensation sequence and the local carrier frequency synchronization sequence, and determining the frequency offset estimation value.

According to the first aspect, in a second possible implementation manner, the performing, by the receive end, frequency offset estimation according to the received synchronization sequence, to obtain a frequency offset estimation value includes:

determining, by the receive end, a start location of the received carrier frequency synchronization sequence according to the received synchronization sequence;

determining, by the receive end, the integer part estimation value according to the received carrier frequency synchronization sequence and the local carrier frequency synchronization sequence;

performing, by the receive end, frequency compensation on the received carrier frequency synchronization sequence according to the integer part estimation value, to obtain a second compensation sequence; and obtaining, by the receive end, the decimal part estimation value according to the second compensation sequence, the local carrier frequency synchronization sequence, and the start location of the received carrier frequency synchronization sequence, and determining the frequency offset estimation value.

According to the first possible implementation manner, in a third possible implementation manner, the determining, by the receive end, a decimal part estimation value of the frequency offset estimation value according to the received carrier frequency synchronization sequence, the start location of the received carrier frequency synchronization sequence, and a local carrier frequency synchronization sequence includes:

performing, by the receive end, cross-correlation processing on the received carrier frequency synchronization sequence and the local carrier frequency synchronization sequence to obtain at least one first correlation value;

determining, by the receive end, the correlation peak location offset according to the start location of the received carrier frequency synchronization sequence and a start location of the largest correlation window corresponding to the largest value of all the first correlation values; and determining, by the receive end according to $$f_r = pos*B/L$$

or $$f_r = -pos*B/L$$

the decimal part estimation value, where $f_r$ indicates the decimal part estimation value, pos indicates the correlation peak location offset, B indicates a system symbol rate, and L indicates a length of the carrier frequency synchronization sequence.

With reference to the first possible implementation manner and the third possible implementation manner, in a fourth possible implementation manner, the obtaining, by the receive end, an integer part estimation value of the frequency offset estimation value according to the first compensation sequence and the local carrier frequency synchronization sequence, and determining the frequency offset estimation value includes:

discretizing, by the receive end, a preset estimation range by using the system symbol rate as a step, to obtain at least one discretized frequency offset value;

performing, by the receive end, frequency compensation on the first compensation sequence according to the discretized frequency offset value, to obtain at least one third compensation sequence;

performing, by the receive end, cross-correlation processing on the at least one third compensation sequence and the local carrier frequency synchronization sequence, to obtain at least one second correlation value; and using, by the receive end as the integer part estimation value, a discretized frequency offset value corresponding to the largest value of all the second correlation values; and the determining, by the receive end, the frequency offset estimation value includes:

adding up, by the receive end, the integer part estimation value and the decimal part estimation value to obtain the frequency offset estimation value.

With reference to the first possible implementation manner, the second possible implementation manner, the third possible implementation manner, and the fourth possible implementation manner, in a fifth possible implementation manner, the determining, by the receive end, a start location of the received carrier frequency synchronization sequence according to the received synchronization sequence includes:

receiving, by the receive end, a differential pseudo random sequence sent by the transmit end;

performing, by the receive end, slipping processing on the received synchronization sequence by using a local pseudo random sequence, to determine a peak value correlation window corresponding to a peak value of a correlation value;

using, by the receive end, a start location of the peak value correlation window as a start location of the received differential pseudo random sequence; and determining, by the receive end, the start location of the received carrier frequency synchronization sequence according to the start location of the received differential pseudo random sequence.

According to the fifth possible implementation manner, in a sixth possible implementation manner, the performing, by the receive end, slipping processing on the received synchronization sequence by using a local pseudo random sequence, to determine a correlation window corresponding to a peak value of a correlation value includes:

repeating, by the receive end, performing the following operations: performing, by the receive end, differential processing on the received synchronization sequence within the correlation window according to a length of the local pseudo random sequence, to obtain a differential processing sequence; and performing, by the receive end, cross-correlation processing on the local pseudo random sequence and the differential processing sequence, to obtain a correlation processing sequence, until a peak value of a correlation value of the correlation processing sequence is obtained, and a correlation window corresponding to the peak value is determined.

According to the sixth possible implementation manner, in a seventh possible implementation manner, the performing, by the receive end, differential processing on the received synchronization sequence within the correlation window according to a length of the local pseudo random sequence, to obtain a differential processing sequence includes:

obtaining, by the receive end according to $$p_{i+k}=\overline{r_{i+k}}^{*}r_{i+k+1}, (k=1,2,\ldots,n)$$

the differential processing sequence, where $p_{i+k}$ (k=1, 2, . . . , n) indicates the differential processing sequence, $r_{i+k}$ (k=1, 2, . . . , n) indicates the received synchronization sequence within the correlation window, n is the length of the local pseudo random sequence, n is a positive integer, i+k indicates a start point of the correlation window when k is 1, i is a non-negative integer, and $\overline{r_{i+k}}$ indicates a conjugate of $r_{i+k}$.

According to the seventh possible implementation manner, in an eighth possible implementation manner, the performing, by the receive end, cross-correlation processing on the local pseudo random sequence and the differential processing sequence, to obtain a correlation processing sequence includes:

obtaining, by the receive end according to $$q_{i+k}=\overline{s_{k}}^{*}p_{i+k}, (k=1,2,\ldots,n)$$

the correlation processing sequence, where $q_{i+k}$ (k=1, 2, . . . , n) indicates the correlation processing sequence, $s_1, s_2, \ldots, s_n$ indicates the local pseudo random sequence, $p_{i+k}$ (k=1, 2, . . . , n) indicates the differential processing sequence, n indicates the length of the local pseudo random sequence, n is a positive integer, i+k indicates a start point of the correlation window when k is 1, and i is a non-negative integer.

According to the eighth possible implementation manner, in a ninth possible implementation manner, that a peak value of a correlation value of the correlation processing sequence is obtained includes:

calculating, by the receive end according to $$\mathrm{corr}_i = \left\| \sum_{k=1}^{n} q_{i+k} \right\|^2, (k = 1, 2, \ldots, n)$$

the correlation value of the correlation processing sequence, until the peak value of the correlation value is obtained, where i starts from 0 and i increases by a step of 1;

$\mathrm{corr}_i$ indicates the correlation value, $q_{i+k}$ (k=1, 2, . . . , n) indicates the correlation processing sequence, n indicates a length of the correlation processing sequence, n is a positive integer, i+k indicates a start point of the correlation window when k is 1, and i is a non-negative integer.

According to a second aspect of the present embodiments, a synchronization signal sending method is provided, including:

generating, by a transmit end, a synchronization sequence, where the synchronization sequence includes a carrier frequency synchronization sequence, the carrier frequency synchronization sequence is $zc(m)=e^{\pm j\pi m(m+1+2q)/L}$, m=0, 1, . . . , L−1, q∈Z, L indicates a length of the carrier frequency synchronization sequence, q indicates a parameter of the carrier frequency synchronization sequence, Z indicates an integer set, $e^{\pm j\pi m(m+1+2q)/L}$ indicates the $(\pm j\pi m(m+1+2q)/L)^{th}$ power of e, and e is a natural constant; and sending, by the transmit end, the synchronization sequence to the receive end, so that the receive end performs frequency offset estimation according to the carrier frequency synchronization sequence, to obtain a frequency offset estimation value.

According to the second aspect, in a first possible implementation manner, the synchronization sequence further includes a differential pseudo random sequence, where the differential pseudo random sequence is $l_i = l_{i-1} * s_{i-1}$, $(i=2, 3, \ldots, n+1)$, $l_1 = \alpha$, $\{s_i\}_{i=1,\ldots,n}$ indicates a local pseudo random sequence, n indicates a length of the local pseudo random sequence, and $\alpha$ is a non-zero complex number, so that the receive end performs slipping processing on the synchronization sequence by using the local pseudo random sequence, to determine a correlation window corresponding to a peak value of a correlation value, and uses a start location of the correlation window as a start location of the differential pseudo random sequence.

According to a third aspect of the present embodiments, a receive end is provided, including:

a receiving module, configured to receive a synchronization sequence sent by a transmit end, where the synchronization sequence includes a carrier frequency synchronization sequence, the carrier frequency synchronization sequence is $zc(m) = e^{\pm j\pi m(m+1+2q)/L}$, $m = 0, 1, \ldots, L-1$, $q \in Z$, L indicates a length of the carrier frequency synchronization sequence, q indicates a parameter of the carrier frequency synchronization sequence, Z indicates an integer set, $e^{\pm j\pi m(m+1+2q)/L}$ indicates the $(\pm j\pi m(m+1+2q)/L)^{th}$ power of e, and e is a natural constant; and an estimation module, configured to perform frequency offset estimation according to the synchronization sequence received by the receiving module, to obtain a frequency offset estimation value.

According to the third aspect, in a first possible implementation manner, the estimation module is specifically configured to:

determine a start location of the received carrier frequency synchronization sequence according to the received synchronization sequence;

determine a decimal part estimation value of the frequency offset estimation value according to the received carrier frequency synchronization sequence, the start location of the received carrier frequency synchronization sequence, and a local carrier frequency synchronization sequence;

perform frequency compensation on the received carrier frequency synchronization sequence according to the decimal part estimation value, to obtain a first compensation sequence; and obtain an integer part estimation value of the frequency offset estimation value according to the first compensation sequence and the local carrier frequency synchronization sequence, and determine the frequency offset estimation value.

According to the third aspect, in a second possible implementation manner, the estimation module is specifically configured to:

determine a start location of the received carrier frequency synchronization sequence according to the received synchronization sequence;

determine the integer part estimation value according to the received carrier frequency synchronization sequence and the local carrier frequency synchronization sequence;

perform frequency compensation on the received carrier frequency synchronization sequence according to the integer part estimation value, to obtain a second compensation sequence; and obtain the decimal part estimation value according to the second compensation sequence, the local carrier frequency synchronization sequence, and the start location of the received carrier frequency synchronization sequence, and determine the frequency offset estimation value.

According to the first possible implementation manner, in a third possible implementation manner, the estimation module is specifically configured to:

perform cross-correlation processing on the received carrier frequency synchronization sequence and the local carrier frequency synchronization sequence to obtain at least one first correlation value;

determine the correlation peak location offset according to the start location of the received carrier frequency synchronization sequence and a start location of the largest correlation window corresponding to the largest value of all the first correlation values; and according to $$f_r = pos * B/L$$

or $$f_r = -pos * B/L$$

determine the decimal part estimation value, where $f_r$ indicates the decimal part estimation value, pos indicates the correlation peak location offset, B indicates a system symbol rate, and L indicates a length of the carrier frequency synchronization sequence.

With reference to the first possible implementation manner and the third possible implementation manner, in a fourth possible implementation manner, the estimation module is specifically configured to:

discretize a preset estimation range by using the system symbol rate as a step, to obtain at least one discretized frequency offset value;

perform frequency compensation on the first compensation sequence according to the discretized frequency offset value, to obtain at least one third compensation sequence;

perform cross-correlation processing on the at least one third compensation sequence and the local carrier frequency synchronization sequence to obtain at least one second correlation value;

use, as the integer part estimation value, a discretized frequency offset value corresponding to the largest value of all the second correlation values; and add up the integer part estimation value and the decimal part estimation value to obtain the frequency offset estimation value.

With reference to the first possible implementation manner, the second possible implementation manner, the third possible implementation manner, and the fourth possible implementation manner, in a fifth possible implementation manner, the estimation module is specifically configured to:

receive a differential pseudo random sequence sent by the transmit end;

perform slipping processing on the received synchronization sequence by using a local pseudo random sequence, to determine a peak value correlation window corresponding to a peak value of a correlation value;

use a start location of the peak value correlation window as a start location of the received differential pseudo random sequence; and determine the start location of the received carrier frequency synchronization sequence according to the start location of the received differential pseudo random sequence.

According to the fifth possible implementation manner, in a sixth possible implementation manner, the estimation module is specifically configured to:

repeat performing the following operations: perform differential processing on the received synchronization sequence within the correlation window according to a length of the local pseudo random sequence, to obtain a differential processing sequence; and perform cross-correlation processing on the local pseudo random sequence and the differential processing sequence, to obtain a correlation processing sequence, until a peak value of a correlation value of the correlation processing sequence is obtained, and a correlation window corresponding to the peak value is determined.

According to the sixth possible implementation manner, in a seventh possible implementation manner, the estimation module is specifically configured to:

according to $$p_{i+k} = \overline{r_{i+k}} * r_{i+k+1}, (k=1,2,\ldots,n)$$

obtain the differential processing sequence, where $p_{i+k}$ (k=1, 2, . . . , n) indicates the differential processing sequence, $r_{i+k}$ (k=1, 2, . . . , n) indicates the received synchronization sequence within the correlation window, n is the length of the local pseudo random sequence, n is a positive integer, i+k indicates a start point of the correlation window when k is 1, i is a non-negative integer, and $\overline{r_{i+k}}$ indicates a conjugate of $r_{i+k}$.

According to the seventh possible implementation manner, in an eighth possible implementation manner, the estimation module is specifically configured to:

according to $$q_{i+k} = \overline{s_k} * p_{i+k}, (k=1,2,\ldots,n)$$

obtain the correlation processing sequence, where $q_{i+k}$ (k=1, 2, . . . , n) indicates the correlation processing sequence, $s_1, s_2, \ldots, s_n$ indicates the local pseudo random sequence, $p_{i+k}$ (k=1, 2, . . . , n) indicates the differential processing sequence, n indicates the length of the local pseudo random sequence, n is a positive integer, i+k indicates a start point of the correlation window when k is 1, and i is a non-negative integer.

According to the eighth possible implementation manner, in a ninth possible implementation manner, the estimation module is specifically configured to:

according to $$\text{corr}_i = \left\| \sum_{k=1}^{n} q_{i+k} \right\|^2, (k=1,2,\ldots,n)$$

calculate the correlation value of the correlation processing sequence, until the peak value of the correlation value is obtained, where i starts from 0 and i increases by a step of 1;

$\text{corr}_i$ indicates the correlation value, $q_{i+k}$ (k=1, 2, . . . , n) indicates the correlation processing sequence, n indicates a length of the correlation processing sequence, n is a positive integer, i+k indicates a start point of the correlation window when k is 1, and i is a non-negative integer.

According to a fourth aspect of the present embodiments, a transmit end is provided, including:

a generation module, configured to generate a synchronization sequence, where the synchronization sequence includes a carrier frequency synchronization sequence, the carrier frequency synchronization sequence is $zc(m)=e^{\pm j\pi m(m+1+2q)/L}$, m=0, 1, . . . , L−1, q∈Z, L indicates a length of the carrier frequency synchronization sequence, q indicates a parameter of the carrier frequency synchronization sequence, Z indicates an integer set, $e^{\pm j\pi m(m+1+2q)/L}$ indicates the $(\pm j\pi m(m+1+2q)/L)^{th}$ power of e, and e is a natural constant; and a sending module, configured to send the synchronization sequence generated by the generation module to the receive end, so that the receive end performs frequency offset estimation according to the carrier frequency synchronization sequence, to obtain a frequency offset estimation value.

According to the fourth aspect, in a first possible implementation manner, the synchronization sequence generated by the generation module further includes a differential pseudo random sequence, where the differential pseudo random sequence is $l_i = l_{i-1} * s_{i-1}$, (i=2, 3, . . . , n+1), $l_1 = \alpha$, $\{s_i\}_{i=1,\ldots,n}$ indicates a local pseudo random sequence, n indicates a length of the local pseudo random sequence, and α is a non-zero complex number, so that the receive end performs slipping processing on the synchronization sequence by using the local pseudo random sequence, to determine a correlation window corresponding to a peak value of a correlation value, and uses a start location of the correlation window as a start location of the differential pseudo random sequence.

According to a fifth aspect of the present embodiments, a receive end is provided, including:

a receiver, configured to receive a synchronization sequence sent by a transmit end, where the synchronization sequence includes a carrier frequency synchronization sequence, the carrier frequency synchronization sequence is $zc(m)=e^{\pm j\pi m(m+1+2q)/L}$, m=0, 1, . . . , L−1, q∈Z, L indicates a length of the carrier frequency synchronization sequence, q indicates a parameter of the carrier frequency synchronization sequence, Z indicates an integer set, $e^{\pm j\pi m(m+1+2q)/L}$ indicates the $(\pm j\pi m(m+1+2q)/L)^{th}$ power of e, and e is a natural constant; and a processor, configured to perform frequency offset estimation according to the synchronization sequence received by the receiver, to obtain a frequency offset estimation value.

According to the fifth aspect, in a first possible implementation manner, the processor is specifically configured to:

determine a start location of the received carrier frequency synchronization sequence according to the received synchronization sequence;

determine a decimal part estimation value of the frequency offset estimation value according to the received carrier frequency synchronization sequence, the start location of the received carrier frequency synchronization sequence, and a local carrier frequency synchronization sequence;

perform frequency compensation on the received carrier frequency synchronization sequence according to the decimal part estimation value, to obtain a first compensation sequence; and obtain an integer part estimation value of the frequency offset estimation value according to the first compensation sequence and the local carrier frequency synchronization sequence, and determine the frequency offset estimation value.

According to the fifth aspect, in a second possible implementation manner, the processor is specifically configured to:

determine a start location of the received carrier frequency synchronization sequence according to the received synchronization sequence;

determine the integer part estimation value according to the received carrier frequency synchronization sequence and the local carrier frequency synchronization sequence;

perform frequency compensation on the received carrier frequency synchronization sequence according to the integer part estimation value, to obtain a second compensation sequence; and obtain the decimal part estimation value according to the second compensation sequence, the local carrier frequency synchronization sequence, and the start location of the received carrier frequency synchronization sequence, and determine the frequency offset estimation value.

According to the first possible implementation manner, in a third possible implementation manner, the processor is specifically configured to:

perform cross-correlation processing on the received carrier frequency synchronization sequence and the local carrier frequency synchronization sequence to obtain at least one first correlation value;

determine the correlation peak location offset according to the start location of the received carrier frequency synchronization sequence and a start location of the largest correlation window corresponding to the largest value of all the first correlation values; and according to $$f_r = pos*B/L$$

or $$f_r = -pos*B/L$$

determine the decimal part estimation value, where $f_r$ indicates the decimal part estimation value, pos indicates the correlation peak location offset, B indicates a system symbol rate, and L indicates a length of the carrier frequency synchronization sequence.

With reference to the first possible implementation manner and the third possible implementation manner, in a fourth possible implementation manner, the processor is specifically configured to:

discretize a preset estimation range by using the system symbol rate as a step, to obtain at least one discretized frequency offset value;

perform frequency compensation on the first compensation sequence according to the discretized frequency offset value, to obtain at least one third compensation sequence;

perform cross-correlation processing on the at least one third compensation sequence and the local carrier frequency synchronization sequence to obtain at least one second correlation value;

use, as the integer part estimation value, a discretized frequency offset value corresponding to the largest value of all the second correlation values; and add up the integer part estimation value and the decimal part estimation value to obtain the frequency offset estimation value.

With reference to the first possible implementation manner, the second possible implementation manner, the third possible implementation manner, and the fourth possible implementation manner, in a fifth possible implementation manner, the processor is specifically configured to:

receive a differential pseudo random sequence sent by the transmit end;

perform slipping processing on the received synchronization sequence by using a local pseudo random sequence, to determine a peak value correlation window corresponding to a peak value of a correlation value;

use a start location of the peak value correlation window as a start location of the received differential pseudo random sequence; and determine the start location of the received carrier frequency synchronization sequence according to the start location of the received differential pseudo random sequence.

According to the fifth possible implementation manner, in a sixth possible implementation manner, the processor is specifically configured to:

repeat performing the following operations: perform differential processing on the received synchronization sequence within the correlation window according to a length of the local pseudo random sequence, to obtain a differential processing sequence; and perform cross-correlation processing on the local pseudo random sequence and the differential processing sequence, to obtain a correlation processing sequence, until a peak value of a correlation value of the correlation processing sequence is obtained, and a correlation window corresponding to the peak value is determined.

According to the sixth possible implementation manner, in a seventh possible implementation manner, the processor is specifically configured to:

according to $$p_{i+k} = \overline{r_{i+k}} * r_{i+k+1}, (k=1,2,\ldots,n)$$

obtain the differential processing sequence, where $p_{i+k}$ (k=1, 2, . . . , n) indicates the differential processing sequence, $r_{i+k}$ (k=1, 2, . . . , n) indicates the received synchronization sequence within the correlation window, n is the length of the local pseudo random sequence, n is a positive integer, i+k indicates a start point of the correlation window when k is 1, i is a non-negative integer, and $\overline{r_{i+k}}$ indicates a conjugate of $r_{i+k}$.

According to the seventh possible implementation manner, in an eighth possible implementation manner, the processor is specifically configured to:

according to $$q_{i+k} = \overline{s_k} * p_{i+k}, (k=1,2,\ldots,n)$$

obtain the correlation processing sequence, where $q_{i+k}$ (k=1, 2, . . . , n) indicates the correlation processing sequence, $s_1, s_2, \ldots, s_n$ indicates the local pseudo random sequence, $p_{i+k}$ (k=1, 2, . . . , n) indicates the differential processing sequence, n indicates the length of the local pseudo random sequence, n is a positive integer, i+k indicates a start point of the correlation window when k is 1, and i is a non-negative integer.

According to the eighth possible implementation manner, in a ninth possible implementation manner, the processor is specifically configured to:

according to $$corr_i = \left\| \sum_{k=1}^{n} q_{i+k} \right\|^2, (k=1,2,\ldots,n)$$

calculate the correlation value of the correlation processing sequence, until the peak value of the correlation value is obtained, where i starts from 0 and i increases by a step of 1;

$corr_i$ indicates the correlation value, $q_{i+k}$ (k=1, 2, ..., n) indicates the correlation processing sequence, n indicates a length of the correlation processing sequence, n is a positive integer, i+k indicates a start point of the correlation window when k is 1, and i is a non-negative integer.

According to a sixth aspect of the present embodiments, a transmit end is provided, including:

a processor, configured to generate a synchronization sequence, where the synchronization sequence includes a carrier frequency synchronization sequence, the carrier frequency synchronization sequence is $zc(m)=e^{\pm j\pi m(m+1+2q)/L}$, m=0, 1, ..., L−1, q∈Z, L indicates a length of the carrier frequency synchronization sequence, q indicates a parameter of the carrier frequency synchronization sequence, Z indicates an integer set, $e^{\pm j\pi m(m+1+2q)/L}$ indicates the $(\pm j\pi m(m+1+2q)/L)^{th}$ power of e, and e is a natural constant; and a transmitter, configured to send the synchronization sequence generated by the processor to the receive end, so that the receive end performs frequency offset estimation according to the carrier frequency synchronization sequence, to obtain a frequency offset estimation value.

According to the sixth aspect, in a first possible implementation manner, the synchronization sequence generated by the processor further includes a differential pseudo random sequence, where the differential pseudo random sequence is $l_i=l_{i-1}*s_{i-1}$, (i=2, 3, ..., n+1), $l_1=\alpha$, $\{s_i\}_{i=1,...,n}$ indicates a local pseudo random sequence, n indicates a length of the local pseudo random sequence, and α is a non-zero complex number, so that the receive end performs slipping processing on the synchronization sequence by using the local pseudo random sequence, to determine a correlation window corresponding to a peak value of a correlation value, and uses a start location of the correlation window as a start location of the differential pseudo random sequence.

According to the synchronization method, the receive end, and the transmit end in embodiments of the present invention, the receive end receives a synchronization sequence sent by the transmit end, where the foregoing synchronization sequence includes a carrier frequency synchronization sequence, the carrier frequency synchronization sequence is $zc(m)=e^{\pm j\pi m(m+1+2q)/L}$, m=0, 1, ..., L−1, q∈Z, L indicates a length of the carrier frequency synchronization sequence, q indicates a parameter of the carrier frequency synchronization sequence, Z indicates an integer set, $e^{\pm j\pi m(m+1+2q)/L}$ indicates the $(\pm j\pi m(m+1+2q)/L)^{th}$ power of e, and e is a natural constant; and then the receive end performs frequency offset estimation according to the received synchronization sequence, to obtain a frequency offset estimation value. In this way, a problem that a frequency offset estimation value is inaccurate due to a small estimation range of an existing carrier frequency offset estimation method is resolved. With the technical solutions in the embodiments of the present invention, an estimation range of frequency offset estimation can be expanded, so that accuracy of a frequency offset estimation value is improved.

BRIEF DESCRIPTION OF DRAWINGS

To describe the technical solutions in the embodiments of the present invention more clearly, the following briefly describes the accompanying drawings required for describing the embodiments or the prior art. Apparently, the accompanying drawings in the following description show some embodiments of the present invention, and persons of ordinary skill in the art may still derive other drawings from these accompanying drawings without creative efforts.

DESCRIPTION OF EMBODIMENTS

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are some but not all of the embodiments of the present invention. All other embodiments obtained by persons of ordinary skill in the art based on the embodiments of the present invention without creative efforts shall fall within the protection scope of the present invention.

Figure 1:
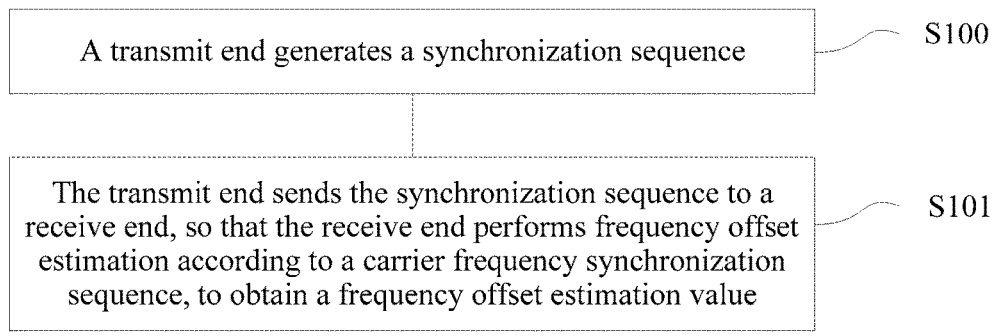
FIG. 1 is a flowchart of a synchronization signal sending method according to an embodiment of the present invention.

FIG. 1 is a flowchart of a synchronization signal sending method according to an embodiment of the present invention. As shown in FIG. 1, the method includes the following steps:

Step S100: A transmit end generates a synchronization sequence.

Step S101: The transmit end sends the synchronization sequence to a receive end, so that the receive end performs frequency offset estimation according to a carrier frequency synchronization sequence, to obtain a frequency offset estimation value.

The steps in this embodiment are executed by the transmit end. In practice, the transmit end may be a base station or a terminal device, where the base station or the terminal device has a signal processing function.

Specifically, the transmit end first generates the synchronization sequence and then sends the foregoing synchronization sequence to the receive end, so that the receive end can complete frequency offset estimation according to the synchronization sequence.

Further, the synchronization sequence generated by the transmit end may include the carrier frequency synchronization sequence. The foregoing carrier frequency synchronization sequence may be a Zadoff-Chu sequence, ZC sequence for short, that has a specified parameter. The ZC sequence has good auto-correlation characteristics and cross-correlation characteristics, and an expression of the ZC sequence is:

$$zc(m)=e^{\pm j\pi m(m+1+2q)/L}, m=0,1,\ldots,L-1, q\in Z \quad (1)$$

where L indicates a length of the sequence, u and q are two parameters of the sequence, and Z indicates an integer set.

In this embodiment, based on the foregoing expression of the ZC sequence, the parameter u of the ZC sequence in expression (1) is set to 1 or −1, and then the ZC sequence is used as the foregoing carrier frequency synchronization sequence. An expression of the two carrier frequency synchronization sequences is:

$$zc(m)=e^{\pm j\pi m(m+1+2q)/L}, m=0,1,\ldots,L-1, q\in Z \quad (2)$$

where L indicates a length of the carrier frequency synchronization sequence, q indicates a parameter of the carrier frequency synchronization sequence, Z indicates an integer set. Same symbols in subsequent embodiments have the same expression meanings as those in this embodiment, and details are not described subsequently.

It should be noted that a generation manner of the foregoing ZC sequence is known to both the transmit end and the receive end.

Optionally, in practice, the transmit end may repeat performing steps S100 to S101 to repeat sending the foregoing synchronization sequence to the receive end, so that the receive end can perform frequency offset estimation according to the received synchronization sequence.

It should be noted that the foregoing synchronization sequence may include another sequence in addition to including the carrier frequency synchronization sequence, and no limitation is set thereto herein.

The following analyzes beneficial effects of the technical solutions provided in this embodiment in comparison with the prior art.

In the prior art, general carrier frequency offset estimation is implemented by means of phase differentiation. Specifically, there is a section of local sequence $m_1, m_2, \ldots, m_a$ with a length of a on the transmit end; the receive end performs symbol timing synchronization processing on a received sequence, that is, determines a start point of the local sequence with a length of a sent by the transmit end, where a processed received sequence is $c_1, c_2, \ldots, c_a$, then the receive end performs cross-correlation processing on the processed received sequence and the local sequence point-by-point to obtain a cross-correlated sequence $c_1', c_2', \ldots c_a'$, and then performs backward reasoning to obtain a carrier frequency offset value by using a phase difference between two adjacent points, that is, calculates a carrier frequency offset value $f_1$ according to $$f_1 = \text{angle}(d) * \frac{B}{2\pi},$$

where B is a system symbol rate, angle(d) indicates a phase difference between two adjacent points of a correlated sequence, $$d = \sum_{i=1}^{a-1} c'_{i+1} * \overline{c'_i},$$

$c_i'=c_i*\overline{m_i}, i=1, 2, \ldots, a$, $\overline{m_i}$ indicates a conjugate of $m_i$, and a range of carrier frequency offset estimation in this method is $[-B/2, B/2]$.

Alternatively, the receive end may perform backward reasoning by using a phase between two points at a distance, which is referred to as a segmented phase differentiation method. For example, the receive end performs phase differentiation on two points at a distance of g points, that is, calculates a carrier frequency offset value $f_2$ according to $$f_2 = \text{angle}(h) * \frac{B}{2\pi * g},$$

where B is a system symbol rate, angle(h) indicates a phase difference between two points at a distance of g points of a correlated sequence, $$h = \sum_{i=1}^{a-l} c'_{i+g} * \overline{c'_i},$$

$c_i'=c_i*\overline{m_i}, i=1, 2, \ldots, a$, $\overline{m_i}$ indicates a conjugate of $m_i$, and a range of carrier frequency offset estimation in the method is $$\left[-\frac{B}{2g}, \frac{B}{2g}\right].$$

The following analyzes a range of carrier frequency offset estimation performed on a ZC sequence generated by using expression (2). A length of the foregoing ZC sequence is L, and a frequency offset value of the ZC sequence may be indicated as εB, where B indicates a system symbol rate, and ε is any real number. It may strictly prove that, for the foregoing ZC sequence, under an ideal condition, the ZC sequence has a correlation peak value in case of any frequency offset value, and on a baseband, an auto-correlation peak value of the foregoing ZC sequence is related to two parameters, the first parameter is $L(\varepsilon-\lfloor\varepsilon\rfloor)$, and the second parameter is $\varepsilon L-\lfloor\varepsilon\rfloor$, where $\lfloor x \rfloor$ indicates rounding down to the nearest integer, and the correlation peak value of the foregoing ZC sequence decreases as the first parameter and the second parameter increase. It may be learned from expression forms of the parameters that the peak value changes with a frequency offset value on a cycle of B. For an over-sampling case, if a system over-sampling rate is $f_s=NB$, and N is an integer greater than 1, in this case, due to impact of over-sampling, it may also strictly prove that the correlation peak value of the foregoing ZC sequence changes with a frequency offset value on a cycle of the sampling rate $f_s$. Therefore, the range of carrier frequency offset estimation performed on the ZC sequence generated by using the foregoing expression (2) is $[-f_s/2, f_s/2]$, and this is a characteristic that another sequence does not have, such as the ZC sequence in which u is not 1 or −1 and that is generated by using expression (1) or a pseudo random sequence with auto-correlation. Because $f_s$ is generally far greater than B, when frequency offset estimation is performed by using the ZC sequence that has the foregoing specified parameter, an estimation range is greater than an estimation range $[-B/2, B/2]$ in the prior art, and the estimation is more accurate.

In this embodiment, a transmit end generates a ZC sequence that has a specified parameter and sends the ZC sequence to a receive end, so that the receive end can perform frequency offset estimation according to a synchronization sequence received by the receive end, to obtain a frequency offset estimation value, thereby improving accuracy of frequency offset estimation.

Figure 2:
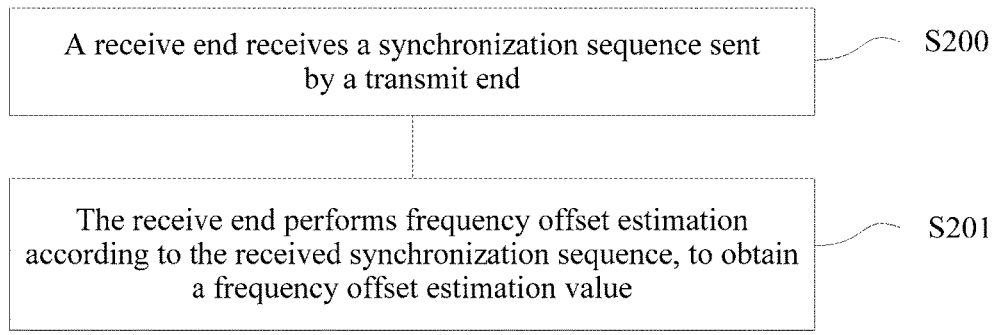
FIG. 2 is a flowchart of a synchronization signal receiving method according to an embodiment of the present invention.

FIG. 2 is a flowchart of a synchronization signal receiving method according to an embodiment of the present invention. As shown in FIG. 2, the method includes the following steps:

Step S200: A receive end receives a synchronization sequence sent by a transmit end.

Step S201: The receive end performs frequency offset estimation according to the received synchronization sequence, to obtain a frequency offset estimation value.

The steps in this embodiment are executed by the receive end. In practice, the receive end may be a base station or a terminal device, where the base station or the terminal device has a signal processing function.

Specifically, the receive end may receive the synchronization sequence sent by the transmit end, and the foregoing synchronization sequence may include a carrier frequency synchronization sequence. The receive end may perform frequency offset estimation according to the carrier frequency synchronization sequence, to obtain the frequency offset estimation value of the foregoing carrier frequency synchronization sequence.

Further, the foregoing carrier frequency synchronization sequence may be a ZC sequence that has a specified parameter, and a specific generation manner of the ZC sequence is shown in expression (2).

After receiving the foregoing synchronization sequence, the receive end may perform frequency offset estimation according to the received synchronization sequence.

Optionally, the receive end may first determine a start location of the received carrier frequency synchronization sequence according to the synchronization sequence received by the receive end; then determine a decimal part estimation value of the frequency offset estimation value according to the foregoing received carrier frequency synchronization sequence, the start location of the received carrier frequency synchronization sequence, and a local carrier frequency synchronization sequence; then perform frequency compensation on the received carrier frequency synchronization sequence according to the foregoing decimal part estimation value, to obtain a first compensation sequence; and then obtain an integer part estimation value of the frequency offset estimation value according to the first compensation sequence and the local carrier frequency synchronization sequence, and determine the frequency offset estimation value.

Optionally, the receive end may, after determining a start location of the received carrier frequency synchronization sequence, first determine an integer part estimation value according to the received carrier frequency synchronization sequence and a local carrier frequency synchronization sequence; then perform frequency compensation on the received carrier frequency synchronization sequence according to the integer part estimation value, to obtain a second compensation sequence; and then obtain a decimal part estimation value according to the second compensation sequence, the local carrier frequency synchronization sequence, and the start location of the received carrier frequency synchronization sequence, and determine the frequency offset estimation value.

It should be noted that the foregoing synchronization sequence may include another sequence in addition to including the carrier frequency synchronization sequence, and no limitation is set thereto herein. In addition, the synchronization sequence herein is not a synchronization sequence directly generated by the transmit end, but is a sequence that is obtained after a synchronization sequence of the transmit end reaches the receive end after passing through a channel, and therefore, the sequence may have noise and interference. In addition, the foregoing local carrier frequency synchronization sequence is a sequence generated by the receive end itself according to a generation manner on which the receive end and the transmit end agree. For example, both the transmit end and the receive end may generate a carrier frequency synchronization sequence in a manner in which u is 1 in expression (1), or may generate a carrier frequency synchronization sequence in a manner in which u is −1 in expression (1).

In addition, in step S201, after the receive end determines the frequency offset estimation value according to the foregoing synchronization sequence, when the transmit end sends another sequence subsequently, the receive end may perform, by using the frequency offset estimation value, frequency compensation on the another sequence sent by the transmit end.

In this embodiment, a receive end receives a synchronization sequence sent by a transmit end, and performs frequency offset estimation according to the synchronization sequence received by the receive end, to obtain a frequency offset estimation value, thereby improving accuracy of frequency offset estimation.

Figure 3:
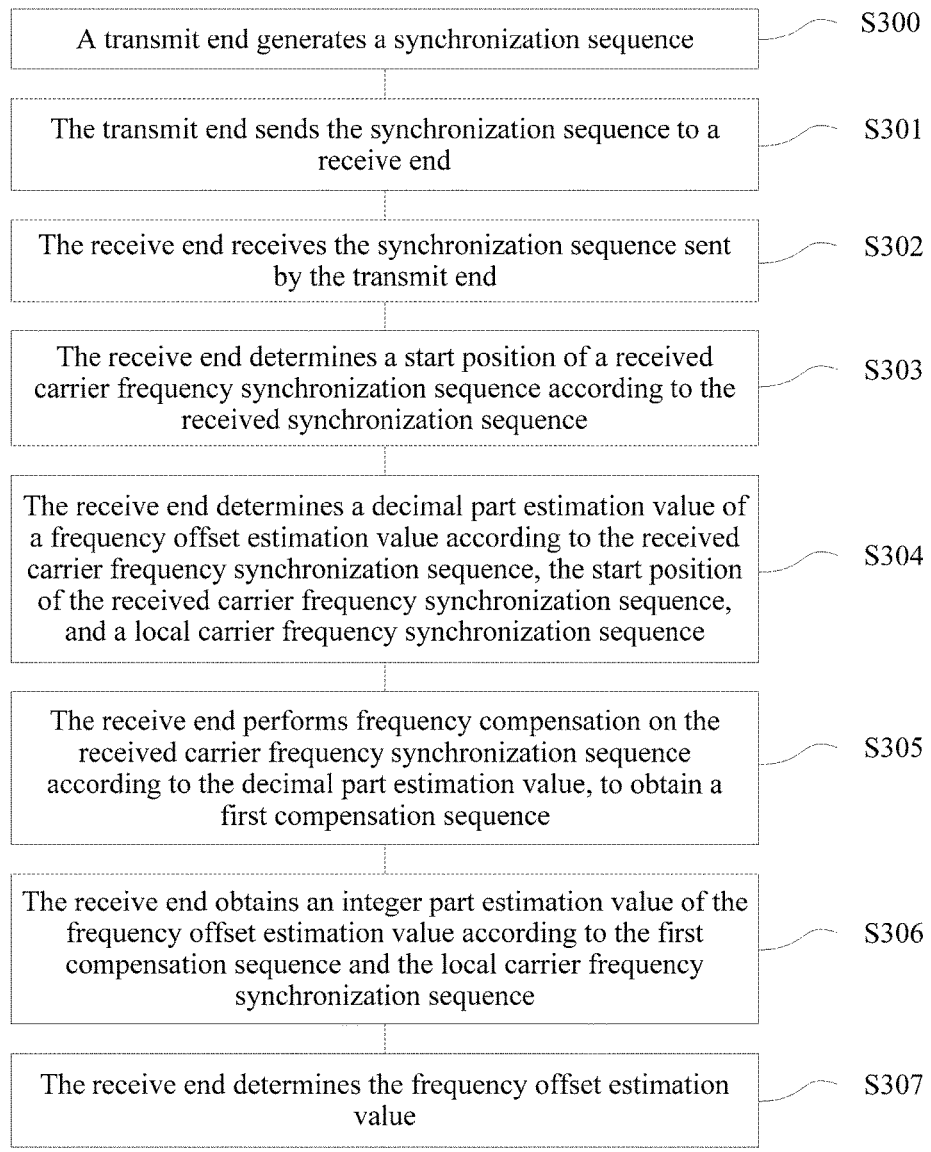
FIG. 3 is a flowchart of still another synchronization method according to an embodiment of the present invention.

FIG. 3 is a flowchart of still another synchronization method according to an embodiment of the present invention. In this embodiment, a synchronization sequence sent by a transmit end includes a carrier frequency synchronization sequence, or may include another sequence. The foregoing carrier frequency synchronization sequence is used for frequency offset estimation of a receive end. It should be noted that a generation manner or the like of the foregoing another sequence is not limited herein, and the foregoing another sequence sent by the transmit end is used for completing symbol timing synchronization of the receive end, so that the receive end can determine, according to a result of the foregoing symbol timing synchronization, a start location of the carrier frequency synchronization sequence received by the receive end. As shown in FIG. 3, the method includes the following steps:

Step S300: The transmit end generates a synchronization sequence.

The foregoing step is executed by the transmit end. In practice, the transmit end may be a base station or a terminal device, where the base station or the terminal device has a signal processing function.

The foregoing synchronization sequence includes a carrier frequency synchronization sequence. A specific generation manner of the carrier frequency synchronization sequence is expression (2). Description of this step is the same as the description of step S200, and details are not described herein.

Step S301: The transmit end sends the synchronization sequence to the receive end.

The foregoing step is executed by the transmit end. In practice, the transmit end may be a base station or a terminal device, where the base station or the terminal device has a signal processing function.

Specifically, after generating the synchronization sequence, the transmit end may send the foregoing synchronization sequence to the receive end, so that the receive end can perform frequency offset estimation according to the carrier frequency synchronization sequence of the foregoing synchronization sequence, to obtain a frequency offset estimation value.

After receiving the foregoing synchronization sequence, the receive end needs to first determine a start location of the foregoing synchronization sequence, so as to determine a start location of the foregoing carrier frequency synchronization sequence, and then perform frequency offset estimation. Therefore, the synchronization sequence sent by the transmit end may include another sequence in addition to including the carrier frequency synchronization sequence, so that the receive end can determine, according to the foregoing another sequence, the start location of the synchronization sequence sent by the transmit end, that is, implement symbol timing synchronization. A generation manner of the foregoing another sequence and a sending sequence of the foregoing another sequence and the foregoing carrier frequency synchronization sequence are not limited herein, provided that the transmit end and the receive end agree in advance on a relationship between the start locations of the foregoing two sequences.

It should be noted that the foregoing another sequence may be a differential pseudo random sequence, specific processes of sending the differential pseudo random sequence and implementing symbol timing synchronization are described in detail in a next embodiment. Certainly, the foregoing another sequence may be another sequence used for implementing symbol timing synchronization in the prior art, and in this case, both processes of sending the foregoing another sequence and implementing symbol timing synchronization by using the foregoing another sequence are the same as those in the prior art.

Step S302: The receive end receives the synchronization sequence sent by the transmit end.

The foregoing step is executed by the receive end. In practice, the receive end may be a base station or a terminal device, where the base station or the terminal device has a signal processing function.

Description of this step is the same as the description of step S200, and details are not described herein.

Step S303: The receive end determines a start location of a received carrier frequency synchronization sequence according to the received synchronization sequence.

The foregoing step is executed by the receive end. In practice, the receive end may be a base station or a terminal device, where the base station or the terminal device has a signal processing function.

Specifically, it can be learned from the description of step S301 that the synchronization sequence sent by the transmit end includes another sequence in addition to including the foregoing carrier frequency synchronization sequence, and the receive end may first determine a start location of the foregoing another sequence according to the another sequence sent by the transmit end, and then determine a start location of the foregoing carrier frequency synchronization sequence according to a relationship between the start location of the foregoing another sequence and the start location of the foregoing carrier frequency synchronization sequence, where the relationship is agreed on by the transmit end and the receive end in advance.

It should be noted that it is not set as a limitation herein that the start location of the received carrier frequency synchronization sequence needs to be determined in the manner in which the transmit end sends the foregoing another sequence. The transmit end may also not send another sequence, provided that the receive end can determine the start location of the received carrier frequency synchronization sequence.

Step S304: The receive end determines a decimal part estimation value of a frequency offset estimation value according to the received carrier frequency synchronization sequence, the start location of the received carrier frequency synchronization sequence, and a local carrier frequency synchronization sequence.

The foregoing step is executed by the receive end. In practice, the receive end may be a base station or a terminal device, where the base station or the terminal device has a signal processing function.

Specifically, the foregoing frequency offset estimation value may be indicated in the following form:

$$f_{offset}=kB+f_r, k\in Z, -B/2 \le f_r B/2 \qquad (3)$$

where $f_{offset}$ indicates the foregoing frequency offset estimation value, Z indicates an integer set, B indicates a system symbol rate, kB indicates an integer part estimation value of the foregoing frequency offset estimation value, and $f_r$ indicates the decimal part estimation value of the foregoing frequency offset estimation value. Same symbols in subsequent embodiments have the same expression meanings as those in this embodiment, and details are not described subsequently.

Further, after determining the start location of the foregoing received carrier frequency synchronization sequence, the receive end may determine the decimal part estimation value of the frequency offset estimation value according to the received carrier frequency synchronization sequence, the start location of the received carrier frequency synchronization sequence, and the local carrier frequency synchronization sequence.

The step may specifically include the following:

(1) The receive end performs cross-correlation processing on the received carrier frequency synchronization sequence and the local carrier frequency synchronization sequence to obtain at least one first correlation value.

Specifically, the local carrier frequency synchronization sequence herein is a sequence generated by the receive end itself according to expression (2), and the receive end may perform, within a preset range, cross-correlation processing on the received carrier frequency synchronization sequence and the local carrier frequency synchronization sequence.

Further, a specific process of the foregoing cross-correlation processing is as follows: The receive end may use a length of the local carrier frequency synchronization sequence as a length of a slipping correlation window, slip the local carrier frequency synchronization sequence within a preset range, and then obtain at least one first cross-correlation value of the local carrier frequency synchronization sequence and the received carrier frequency synchronization sequence. In practice, the receive end may first perform, starting from the start location of the received carrier frequency synchronization sequence, point-by-point correlation on a section of a sequence with a length of L starting from the start location and a section of the local carrier frequency synchronization sequence with the same length of L, to obtain one first cross-correlation value; then slip the foregoing local carrier frequency synchronization sequence rightwards or leftwards; calculate, each time the local carrier frequency synchronization sequence is slipped by one symbol, one first cross-correlation value corresponding to the correlation window, that is, a cross-correlation value of a carrier frequency synchronization sequence received within the correlation window and the foregoing local carrier frequency synchronization sequence; and finally can obtain at least one first cross-correlation value. For example, the foregoing preset range may be L/2. In this case, the receive end may slip leftwards by a distance of L/2, to obtain L/2 first correlation values, then slip rightwards by a distance of L/2, to obtain L/2 first correlation values, and finally, obtain L+1 first cross-correlation values. Certainly, a specific length of the foregoing preset distance is not limited herein; a sequence of the foregoing slipping is not limited, and both are all right.

(2) The receive end determines a correlation peak location offset according to the start location of the received carrier frequency synchronization sequence and a start location of the largest correlation window corresponding to the largest value of all the first correlation values.

Specifically, the receive end may determine the correlation peak location offset according to the start location of the received carrier frequency synchronization sequence and the foregoing at least one first cross-correlation value.

Further, the receive end may select one largest value from the foregoing at least one first cross-correlation value. The receive end uses the length of the local carrier frequency synchronization sequence as the length of the slipping correlation window to obtain the first cross-correlation value, and therefore, the largest value is corresponding to one correlation window, that is, the largest correlation window. In this case, the receive end calculates a relative offset of the start location of the received carrier frequency synchronization sequence to a start location of the foregoing largest correlation window, that is, the foregoing correlation peak location offset. For example, if the largest value of the foregoing first cross-correlation value is obtained by calculation when the local carrier frequency synchronization sequence is slipped leftwards by 3 symbols relative to the start location of the received carrier frequency synchronization sequence, in this case, the correlation peak location offset is −3; if the largest value of the foregoing first cross-correlation value is obtained by calculation when the local carrier frequency synchronization sequence is slipped rightwards by 3 symbols relative to the start location of the received carrier frequency synchronization sequence, in this case, the correlation peak location offset is 3.

(3) The receive end determines the decimal part estimation value.

Specifically, the receive end may determine, according to $$f_r = pos * B/L \quad (4)$$

or $$f_r = -pos * B/L \quad (5)$$

the decimal part estimation value, where $f_r$ indicates the foregoing decimal part estimation value, pos indicates the foregoing correlation peak location offset, and when the foregoing carrier frequency synchronization sequence is a ZC sequence generated by using expression (1) with u being 1, the foregoing decimal part estimation value is calculated by using expression (4); when the foregoing carrier frequency synchronization sequence is a ZC sequence generated by using expression (1) with u being −1, the foregoing decimal part estimation value is calculated by using expression (5).

Step S305: The receive end performs frequency compensation on the received carrier frequency synchronization sequence according to the decimal part estimation value, to obtain a first compensation sequence.

The foregoing step is executed by the receive end. In practice, the receive end may be a base station or a terminal device, where the base station or the terminal device has a signal processing function.

Specifically, after the decimal part estimation value is calculated, the receive end may perform frequency compensation on the received carrier frequency synchronization sequence by using the foregoing decimal part estimation value, to obtain the compensated first compensation sequence.

Step S306: The receive end obtains an integer part estimation value of the frequency offset estimation value according to the first compensation sequence and the local carrier frequency synchronization sequence.

The foregoing step is executed by the receive end. In practice, the receive end may be a base station or a terminal device, where the base station or the terminal device has a signal processing function.

Specifically, according to the description of expression (4) or expression (5), after the decimal part estimation value is determined, the integer part estimation value further needs to be determined before the final frequency offset estimation value can be determined.

The step may specifically include the following:

(1) The receive end discretizes a preset estimation range by using the system symbol rate as a step, to obtain at least one discretized frequency offset value.

Specifically, the foregoing preset estimation range is determined in advance. In practice, the value may be determined according to emulation experience or hardware specifications. The receive end may discretize the foregoing preset estimation range by using the system symbol rate as a step. For example, if the preset estimation range is [−20, 20] kHz, and the system symbol rate is 5 kHz, the at least one discretized frequency offset value obtained after the discretization is: −20 kHz, −15 kHz, −10 kHz, −5 kHz, 0 kHz, 5 kHz, 10 kHz, 15 kHz, and 20 kHz.

(2) The receive end performs frequency compensation on the first compensation sequence according to the discretized frequency offset value, to obtain at least one third compensation sequence.

Specifically, after the at least one discretized frequency offset value is determined, the receive end may perform frequency compensation on the first compensation sequence by using the foregoing at least one discretized frequency offset value.

For example, the receive end may separately perform frequency compensation on the first compensation sequence by using each of the foregoing discretized frequency offset value, where each discretized frequency offset value is corresponding to one third compensation sequence.

(3) The receive end performs cross-correlation processing on the at least one third compensation sequence and the local carrier frequency synchronization sequence, to obtain at least one second correlation value.

Specifically, the receive end may perform cross-correlation processing on each of the foregoing third compensation sequence and the local carrier frequency synchronization sequence, to obtain the at least one second cross-correlation value.

(4) The receive end uses, as the integer part estimation value, a discretized frequency offset value corresponding to the largest value of all the second correlation values.

Specifically, the receive end may determine one largest value from the foregoing at least one second cross-correlation value and use, as the foregoing integer part estimation value, a discretized frequency offset value corresponding to the largest value.

Step S307: The receive end determines the frequency offset estimation value.

The foregoing step is executed by the receive end. In practice, the receive end may be a base station or a terminal device, where the base station or the terminal device has a signal processing function.

Specifically, after the decimal part estimation value and the integer part estimation value are determined, the receive end may add them up to obtain the final frequency offset estimation value.

It should be noted that a calculation sequence of the integer part estimation value and the decimal part estimation value is not limited herein. In practice, the integer part estimation value may be calculated first and then the decimal part estimation value is calculated, and finally they are added up to determine the final frequency offset estimation value. Specifically, the receive end first still determines the start location of the received carrier frequency synchronization sequence according to the received synchronization sequence; then, the receive end may determine the integer part estimation value according to the received carrier frequency synchronization sequence and the local carrier frequency synchronization sequence, where a specific process of this step is the same as step S306, and only the first compensation sequence needs to be replaced with the received carrier frequency synchronization sequence; then, the receive end may perform frequency compensation on the received carrier frequency synchronization sequence according to the integer part estimation value, to obtain a second compensation sequence; then, the receive end may obtain the decimal part estimation value according to the foregoing second compensation sequence, the local carrier frequency synchronization sequence, and the start location of the received carrier frequency synchronization sequence, where a specific process of this step is the same as step S305, and only the received carrier frequency synchronization sequence needs to be replaced with the second compensation sequence; and finally, a process of determining the frequency offset estimation value is the same as step S307.

In this embodiment, a transmit end generates a ZC sequence that has a specified parameter and sends the ZC sequence to a receive end, so that the receive end can perform frequency offset estimation according to a synchronization sequence received by the receive end, to obtain a frequency offset estimation value, thereby improving accuracy of frequency offset estimation.

Figure 4:
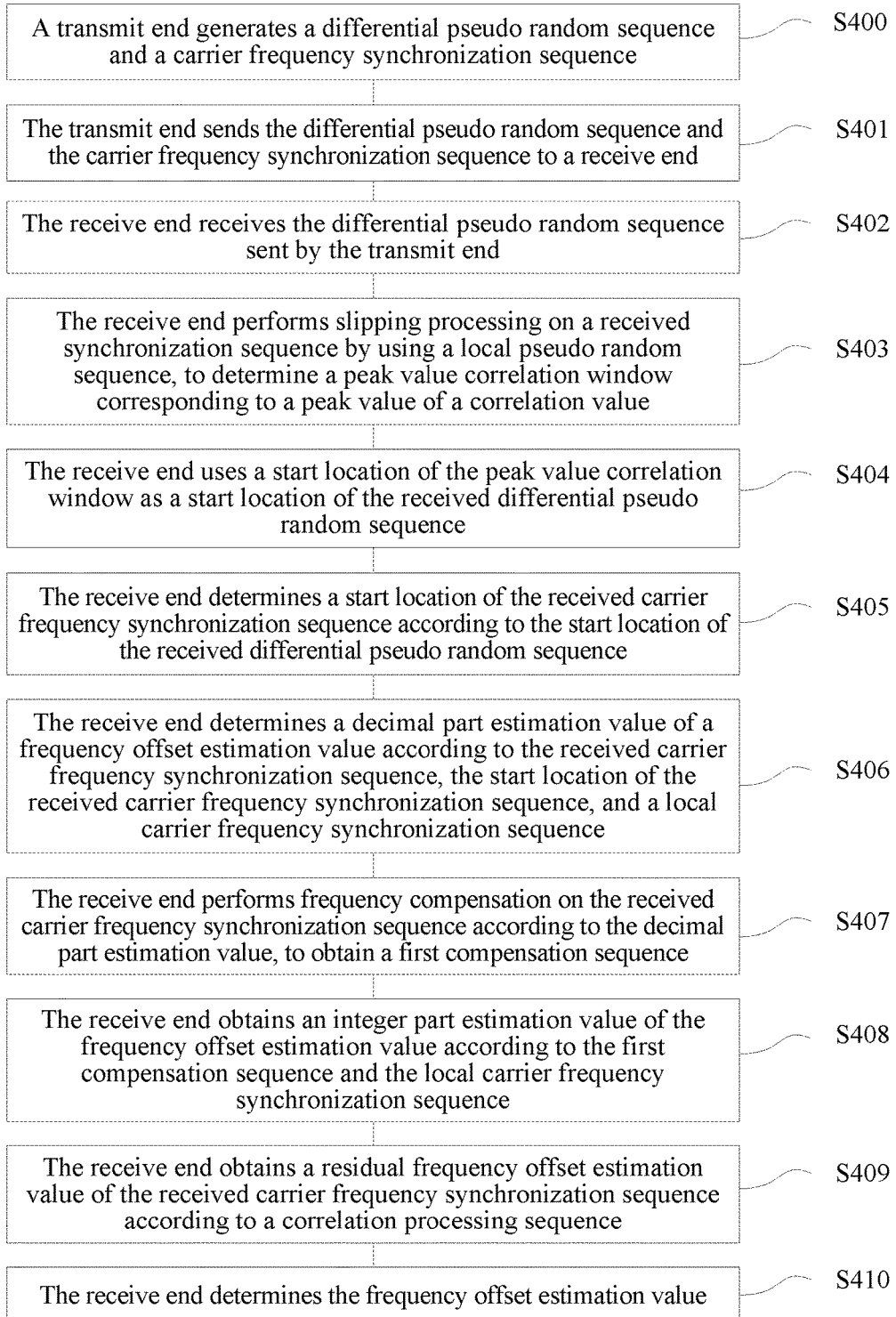
FIG. 4 is a flowchart of still another synchronization method according to an embodiment of the present invention.

FIG. 4 is a flowchart of still another synchronization method according to an embodiment of the present invention. Different from the previous embodiment, in this embodiment, a synchronization sequence sent by a transmit end to a receive end includes a carrier frequency synchronization sequence and a differential pseudo random sequence, where the carrier frequency synchronization sequence is used for frequency offset estimation of the receive end, and the differential pseudo random sequence is used for symbol timing synchronization of the receive end, that is, for the receive end to determine a start location of the received differential pseudo random sequence. As shown in FIG. 4, the method includes the following steps:

Step S400: The transmit end generates a differential pseudo random sequence and a carrier frequency synchronization sequence.

The foregoing step is executed by the transmit end. In practice, the transmit end may be a base station or a terminal device, where the base station or the terminal device has a signal processing function.

Specifically, description of this step is the same as the description of step S100, only that the synchronization sequence in this case includes the carrier frequency synchronization sequence and the differential pseudo random sequence, a generation manner of the foregoing carrier frequency synchronization sequence is expression (2), and a specific generation formula of the foregoing differential pseudo random sequence is:

$$l_i = l_{i-1} * s_{i-1}, (i=2,3,\ldots,n+1), l_1=\alpha, \{s_i\}_{i=1},\ldots,n \quad (6)$$

where $l_i$ indicates the foregoing differential pseudo random sequence, n indicates a length of a local pseudo random sequence, $\alpha$ is any non-zero complex number, and $\{s_i\}_{i=1,\ldots,n}$ indicates the local pseudo random sequence.

Step S401: The transmit end sends the differential pseudo random sequence and the carrier frequency synchronization sequence to the receive end.

The foregoing step is executed by the transmit end. In practice, the receive end may be a base station or a terminal device, where the base station or the terminal device has a signal processing function.

Specifically, the transmit end may send the foregoing differential pseudo random sequence and the foregoing carrier frequency synchronization sequence to the receive end, so that the receive end performs slipping processing on the synchronization sequence by using the local pseudo random sequence, to determine a correlation window corresponding to a peak value of a correlation value, use a start location of the correlation window as a start location of the differential pseudo random sequence; and performs frequency offset estimation according to the carrier frequency synchronization sequence, to obtain a frequency offset estimation value.

It should be noted that a sequence of sending the foregoing carrier frequency synchronization sequence and the foregoing differential pseudo random sequence is not limited herein, and they are not necessarily sent successively. The transmit end may send one sequence and then send a section of other information, and then send another sequence, provided that the receive end and the transmit end agree in advance on a relationship between start locations of the foregoing two sequences. In addition, the transmit end may repeatedly send the foregoing two sequences to the receive end, to ensure that the receive end can complete symbol timing synchronization and frequency offset estimation.

Step S402: The receive end receives the differential pseudo random sequence sent by the transmit end.

The foregoing step is executed by the receive end. In practice, the receive end may be a base station or a terminal device, where the base station or the terminal device has a signal processing function.

Specifically, after the transmit end sends the differential pseudo random sequence, the receive end needs to receive the foregoing differential pseudo random sequence. It should be noted that, in practice, a sequence sent by the transmit end to the receive end may include not only the differential pseudo random sequence, and therefore, when receiving the sequence, the receive end does not know a start location of the foregoing differential pseudo random sequence.

Step S403: The receive end performs slipping processing on a received synchronization sequence by using a local pseudo random sequence, to determine a peak value correlation window corresponding to a peak value of a correlation value.

The foregoing step is executed by the receive end. In practice, the receive end may be a base station or a terminal device, where the base station or the terminal device has a signal processing function.

Specifically, the foregoing local pseudo random sequence is a sequence generated by the receive end itself according to expression (6).

Further, the receive end may repeat performing the following operations, until a peak value of a correlation value of a correlation processing sequence is obtained, and a correlation window corresponding to the peak value is determined.

(1) The receive end performs differential processing on the received synchronization sequence within the correlation window according to a length of the local pseudo random sequence, to obtain a differential processing sequence.

Specifically, the receive end may perform slipping processing with a window length of n+1 on a received sequence $\{r_i\}_{i=1,\ldots}$ by using a local pseudo random sequence $s_1, s_2, \ldots, s_n$. It is assumed that a received synchronization sequence within a correlation window i is $r_{i+1}, r_{i+2}, \ldots, r_{i+n+1}$, and the receive end performs conjugate multiplication on $r_{i+1}, r_{i+2}, \ldots, r_{i+n}$ and $r_{i+1}, r_{i+2}, \ldots, r_{i+n+1}$, to obtain a differential processing sequence $p_{i+1}, p_{i+2}, \ldots, p_{i+n}$ corresponding to the correlation window i. That is, the receive end may obtain, according to $$p_{i+k} = \overline{r_{i+k}} * r_{i+k+1}, (k=1,2,\ldots,n) \quad (7)$$

the differential processing sequence, where $p_{i+k}$ (k=1, 2, ..., n) that is, $p_{i+1}, p_{i+2}, \ldots, p_{i+n}$, indicates the differential processing sequence, $r_{i+k}$ (k=1, 2 ... n), that is, $p_{i+1}, p_{i+2}, \ldots, p_{i+n+1}$, indicates the received synchronization sequence within the correlation window, n is the length of the local pseudo random sequence, n is a positive integer, i+k indicates a start point of the foregoing correlation window i when k is 1, i is a non-negative integer, and $\overline{r_{i+k}}$ indicates a conjugate of $r_{i+k}$. Same symbols in subsequent embodiments have the same expression meanings as those in this embodiment, and details are not described subsequently.

(2) The receive end performs cross-correlation processing on the local pseudo random sequence and the differential processing sequence, to obtain a correlation processing sequence, until a peak value of a correlation value of the correlation processing sequence is obtained.

Specifically, the receive end may perform point-by-point correlation on the differential processing sequence $p_{i+k}$ (k=1, 2, ..., n) that is, $p_{i+1}, p_{i+2}, \ldots, p_{i+n}$, of the correlation window and the local pseudo random sequence $s_1, s_2, \ldots, s_n$, to obtain a correlation processing sequence $q_{i+k}$ (k=1, 2, ..., n) corresponding to the correlation window i. That is, the receive end may obtain, according to $$q_{i+k} = \overline{s_k} * p_{i+k}, (k=1,2,\ldots,n) \quad (8)$$

the correlation processing sequence $q_{i+k}$ (k=1, 2, ..., n) that is, $q_{i+1}, q_{i+2}, \ldots, q_{i+n}$;

and the receive end may calculate, according to $$\text{corr}_i = \left\| \sum_{k=1}^{n} q_{i+k} \right\|^2, (k=1, 2, \ldots, n) \quad (9)$$

a correlation value $\text{corr}_i$ of the correlation processing sequence, and calculate the peak value of the correlation value, that is, the correlation peak value, where i starts from i=0 and i increases by a step of 1.

Specifically, each correlation window i is corresponding to one correlation value $\text{corr}_i$, and the receive end obtains at least one correlation value when i increases by the step of 1. To determine the peak value of the correlation value, the receive end may preset a threshold, and once a calculated correlation value exceeds the preset threshold, consider the correlation value corresponding to the correlation window as the peak value. Alternatively, the receive end may perform slipping within a length, for example, perform slipping within a length of one data frame. It is assumed that one data frame has 300 symbols. The receive end calculates 300 correlated values by increasing i from 0 to 299, and then finds out the largest value; compares the largest value with the preset threshold; and if the largest value exceeds the threshold, uses the largest value as the peak value. If no peak value is found in the foregoing step, the receive end continues to perform slipping backwards and repeats the foregoing actions until the correlation peak value is found.

Step S404: The receive end uses a start location of the peak value correlation window as a start location of the received differential pseudo random sequence.

The foregoing step is executed by the receive end. In practice, the receive end may be a base station or a terminal device, where the base station or the terminal device has a signal processing function.

Specifically, after the peak value of the foregoing correlation value is determined, the receive end may use, as the start location of the received differential pseudo random sequence, the start location of the correlation window corresponding to the peak value.

The receive end can complete symbol timing synchronization by performing the operations in foregoing steps S402 to S404.

The following analyzes a phase change of the differential pseudo random sequence on the transmit end and the receive end in the foregoing process. It is assumed that an initial phase of the local pseudo random sequence $s_1, s_2, \ldots, s_n$, is $\theta_1, \theta_2, \ldots, \theta_n$, an initial phase of the differential pseudo random sequence $l_1, l_2 \ldots l_{n+1}$ is $\theta_0$, $d_x$ is a Doppler frequency shift of a channel through which the $x^{th}$ sampling point of the foregoing differential pseudo random sequence passes, $\Delta f$ is a frequency offset difference between two adjacent symbols, $\Delta f = 2\pi f/B$, f is a frequency offset value, and B is a system symbol rate.

First, because the differential pseudo random sequence $l_1, l_2 \ldots l_{n+1}$ of the transmit end is generated from the local pseudo random sequence $s_1, s_2, \ldots, s_n$, a phase of the differential pseudo random sequence is $$\theta_0, \theta_0 + \theta_1, \theta_0 + \theta_1 + \theta_2, \ldots \theta_0 + \sum_{i=1}^{n} \theta_n.$$

Then, because the foregoing differential pseudo random sequence is affected by the Doppler frequency shift in a transmission process, especially in a high mobility scenario, the Doppler frequency shift is relatively significant. A phase of the received synchronization sequence $r_{i+1}, r_{1+2}, \ldots, r_{1+n+1}$ may be indicated as $$\theta_0 + \Delta f + d_1, \theta_0 + \theta_1 + 2\Delta f + d_2, \ldots \theta_0 + \sum_{i=1}^{n} \theta_n + n\Delta f + d_{n+1}.$$

Then, after performing differential processing on the foregoing received synchronization sequence, the receive end may obtain a differential processing sequence $p_{i+1}, p_{1+2}, \ldots p_{i+n}$ corresponding to the correlation window i, and a phase of the differential processing sequence may be indicated as $$\theta_0 + \Delta f + (d_2 - d_1), \theta_0 + \theta_1 + \Delta f + (d_3 - d_2),$$

$$\ldots \theta_0 + \sum_{i=1}^{n} \theta_n + \Delta f + (d_{n+1} - d_n).$$

Finally, the receive end performs cross-correlation processing on the differential processing sequence $p_{i+1}$, $p_{i+2}, \ldots, p_{i+n}$ of the foregoing correlation window i and the local pseudo random sequence $s_1, s_2, \ldots, s_n$, to obtain a phase of the correlation processing sequence $q_{i+1}, q_{i+2}, \ldots q_{i+n}$ corresponding to the correlation window $\Delta f+(d_2-d_1)$, $\Delta f+(d_3-d_2), \ldots \Delta f+(d_{n+1}-d_n)$.

In practice, channels through which two adjacent sampling points pass may be considered as approximately the same, that is, $d_{i+1}-d_i \approx 0$. Therefore, the foregoing correlation processing sequence $q_{i+1}, q_{i+2}, \ldots, q_{i+n}$ is approximately in-phase, and when the correlation value of the correlation processing sequence is obtained, no mutual phase cancellation phenomenon caused due to conjugate multiplication occurs, the correlation value of $q_{i+1}, q_{i+2}, \ldots, q_{i+n}$ is not affected, and the finally determined start location of the differential pseudo random sequence is not affected either. Therefore, this symbol timing synchronization manner can effectively cope with a high carrier frequency offset capability and high mobility.

Step S405: The receive end determines a start location of the received carrier frequency synchronization sequence according to the start location of the received differential pseudo random sequence.

The foregoing step is executed by the receive end. In practice, the receive end may be a base station or a terminal device, where the base station or the terminal device has a signal processing function.

Specifically, it can be learned from the description of step S401 that the transmit end and the receive end agree in advance on a relationship between the start location of the foregoing differential pseudo random sequence and the start location of the carrier frequency synchronization sequence; for example, the start location of the differential pseudo random sequence and the start location of the carrier frequency synchronization sequence are at a distance of 300 symbols, and then after determining the start location of the differential pseudo random sequence, the receive end may determine that a location at a distance of 300 symbols is the start location of the carrier frequency synchronization sequence.

Step S406: The receive end determines a decimal part estimation value of a frequency offset estimation value according to the received carrier frequency synchronization sequence, the start location of the received carrier frequency synchronization sequence, and a local carrier frequency synchronization sequence.

Step S407: The receive end performs frequency compensation on the received carrier frequency synchronization sequence according to the decimal part estimation value, to obtain a first compensation sequence.

Step S408: The receive end obtains an integer part estimation value of the frequency offset estimation value according to the first compensation sequence and the local carrier frequency synchronization sequence.

The foregoing steps S406 to S408 are executed by the receive end. In practice, the receive end may be a base station or a terminal device, where the base station or the terminal device has a signal processing function.

Specific processes of the foregoing steps S406 to S408 are the same as steps S304 to S306, and details are not described herein. Certainly, the integer part estimation value may also be calculated first and then the decimal part estimation value is calculated. This process is the same as the description of a related part in step S306, and details are not described herein.

Step S409: The receive end obtains a residual frequency offset estimation value of the received carrier frequency synchronization sequence according to a correlation processing sequence.

The foregoing step is executed by the receive end. In practice, the receive end may be a base station or a terminal device, where the base station or the terminal device has a signal processing function.

Specifically, after separately completing symbol timing synchronization and frequency offset estimation according to the foregoing differential pseudo random sequence and the foregoing carrier frequency synchronization sequence, the receive end may further calculate the residual frequency offset estimation value by using the correlation processing sequence $q_{i+1}, q_{i+2}, \ldots, q_{i+n}$ obtained in a symbol timing synchronization process.

Further, the receive end may obtain, according to $$b = \text{angle}\left(\sum_{k=1}^{n} q_k\right) * \frac{B}{2\pi}, (k = 1, 2, \ldots, n) \tag{10}$$

the residual frequency offset estimation value b, where angle(x) indicates a phase of x.

It should be noted that the residual frequency offset estimation value is a residual frequency offset obtained after calculation of the decimal part estimation value and the integer part estimation value is complete. In addition, the residual frequency offset estimation value may be first calculated after symbol timing synchronization is complete, and then steps S405 to S408 are performed. In addition, this step is optional.

Step S410: The receive end determines the frequency offset estimation value.

The foregoing step is executed by the receive end. In practice, the receive end may be a base station or a terminal device, where the base station or the terminal device has a signal processing function.

Specifically, the receive end may add up the foregoing integer part estimation value, the decimal part estimation value, and the residual frequency offset estimation value to obtain the final frequency offset estimation value.

In this embodiment, a transmit end generates a differential pseudo random sequence and a ZC sequence that has a specified parameter and sends the differential pseudo random sequence and the ZC sequence to a receive end, so that the receive end can perform symbol timing synchronization and frequency offset estimation according to a synchronization sequence received by the receive end, to obtain a frequency offset estimation value, thereby improving a capability of resisting a high carrier frequency offset and resistance to mobility during symbol timing synchronization and also improving accuracy of frequency offset estimation.

Figure 5:
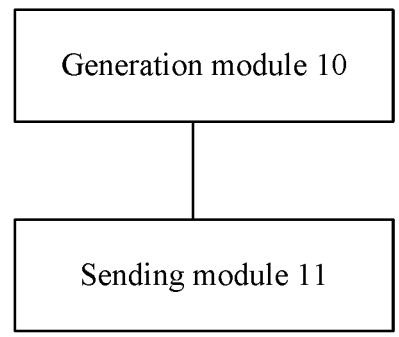
FIG. 5 is a schematic structural diagram of a transmit end according to an embodiment of the present invention.

FIG. 5 is a schematic structural diagram of a transmit end according to an embodiment of the present invention. As shown in FIG. 5, the transmit end includes: a generation module 10 and a sending module 11.

Specifically, the generation module 10 is configured to generate a synchronization sequence, where the synchronization sequence includes a carrier frequency synchronization sequence, the carrier frequency synchronization sequence is $zc(m)=e^{\pm j\pi m(m+1+2q)/L}$, $m=0, 1, \ldots, L-1$, $q\in Z$, L indicates a length of the carrier frequency synchronization sequence, q indicates a parameter of the carrier frequency synchronization sequence, Z indicates an integer set, $e^{\pm j\pi m(m+1+2q)/L}$ indicates the $(\pm j\pi m(m+1+2q)/L)^{th}$ power of e, and e is a natural constant; and the sending module 11 is configured to send the synchronization sequence generated by the generation module 10 to a receive end, so that the receive end performs frequency offset estimation according to the carrier frequency synchronization sequence, to obtain a frequency offset estimation value.

Further, the synchronization sequence generated by the foregoing generation module 10 further includes a differential pseudo random sequence, where the differential pseudo random sequence $l_i = l_{i-1}^* s_{i-1}$, $(i=2, 3, \ldots, n+1)$, $l_1=\alpha$, $\{s_i\}_{i=1,\ldots,n}$ indicates a local pseudo random sequence, n indicates a length of the local pseudo random sequence, and $\alpha$ is a non-zero complex number, so that the receive end performs slipping processing on the synchronization sequence by using the local pseudo random sequence, to determine a correlation window corresponding to a peak value of a correlation value; and uses a start location of the correlation window as a start location of the differential pseudo random sequence.

In this embodiment, a transmit end generates a ZC sequence that has a specified parameter and sends the ZC sequence to a receive end, so that the receive end can perform frequency offset estimation according to a synchronization sequence received by the receive end, to obtain a frequency offset estimation value, thereby improving accuracy of frequency offset estimation.

Figure 6:
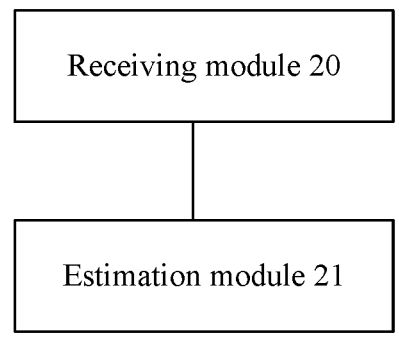
FIG. 6 is a schematic structural diagram of a receive end according to an embodiment of the present invention.

FIG. 6 is a schematic structural diagram of a receive end according to an embodiment of the present invention. As shown in FIG. 6, the receive end includes: a receiving module 20 and an estimation module 21.

Specifically, the receiving module 20 is configured to receive a synchronization sequence sent by a transmit end, where the synchronization sequence includes a carrier frequency synchronization sequence, the carrier frequency synchronization sequence is $zc(m)=e^{\pm j\pi m(m+1+2q)/L}$, $m=0, 1, \ldots, L-1$, $q\in Z$, L indicates a length of the carrier frequency synchronization sequence, q indicates a parameter of the carrier frequency synchronization sequence, Z indicates an integer set, $e^{\pm j\pi m(m+1+2q)/L}$ indicates the $(\pm j\pi m(m+1+2q)/L)^{th}$ power of e, and e is a natural constant; and the estimation module 21 is configured to perform frequency offset estimation according to the synchronization sequence received by the receiving module 20, to obtain a frequency offset estimation value.

Further, the estimation module 21 is specifically configured to: determine a start location of the received carrier frequency synchronization sequence according to the received synchronization sequence; determine a decimal part estimation value of the frequency offset estimation value according to the received carrier frequency synchronization sequence, the start location of the received carrier frequency synchronization sequence, and a local carrier frequency synchronization sequence; perform frequency compensation on the received carrier frequency synchronization sequence according to the decimal part estimation value, to obtain a first compensation sequence; and obtain an integer part estimation value of the frequency offset estimation value according to the first compensation sequence and the local carrier frequency synchronization sequence, and determine the frequency offset estimation value.

Further, the estimation module 21 is specifically configured to: determine a start location of the received carrier frequency synchronization sequence according to the received synchronization sequence; determine an integer part estimation value according to the received carrier frequency synchronization sequence and a local carrier frequency synchronization sequence; perform frequency compensation on the received carrier frequency synchronization sequence according to the integer part estimation value, to obtain a second compensation sequence; and obtain a decimal part estimation value according to the second compensation sequence, the local carrier frequency synchronization sequence, and the start location of the received carrier frequency synchronization sequence, and determine the frequency offset estimation value.

Further, the estimation module 21 is specifically configured to: perform cross-correlation processing on the received carrier frequency synchronization sequence and the local carrier frequency synchronization sequence to obtain at least one first correlation value; determine a correlation peak location offset according to the start location of the received carrier frequency synchronization sequence and a start location of the largest correlation window corresponding to the largest value of all the first correlation values; and according to $$f_r = pos * B/L \qquad (11)$$

or $$f_r = -pos * B/L \qquad (12)$$

determine the decimal part estimation value, where $f_r$ indicates the decimal part estimation value, pos indicates the correlation peak location offset, B indicates a system symbol rate, and L indicates a length of the carrier frequency synchronization sequence.

Further, the estimation module 21 is specifically configured to: discretize a preset estimation range by using the system symbol rate as a step, to obtain at least one discretized frequency offset value; perform frequency compensation on the first compensation sequence according to the discretized frequency offset value, to obtain at least one third compensation sequence; perform cross-correlation processing on the at least one third compensation sequence and the local carrier frequency synchronization sequence, to obtain at least one second correlation value; use, as the integer part estimation value, a discretized frequency offset value corresponding to the largest value of all the second correlation values; and add up the integer part estimation value and the decimal part estimation value to obtain the frequency offset estimation value.

Further, the estimation module 21 is specifically configured to: receive a differential pseudo random sequence sent by the transmit end; perform slipping processing on the received synchronization sequence by using a local pseudo random sequence, to determine a peak value correlation window corresponding to a peak value of a correlation value; use a start location of the peak value correlation window as a start location of the received differential pseudo random sequence; and determine the start location of the received carrier frequency synchronization sequence according to the start location of the received differential pseudo random sequence.

Further, the estimation module 21 is specifically configured to: repeat performing the following operations: perform differential processing on the received synchronization sequence within the correlation window according to a length of the local pseudo random sequence, to obtain a differential processing sequence; and perform cross-correlation processing on the local pseudo random sequence and the differential processing sequence, to obtain a correlation processing sequence, until a peak value of a correlation value of the correlation processing sequence is obtained, and a correlation window corresponding to the peak value is determined.

Further, the estimation module 21 is specifically configured to:

according to $$p_{i+k} = \overline{r_{i+k}} * r_{i+k+1}, (k=1,2,\ldots,n) \quad (13)$$

obtain the differential processing sequence, where $p_{i+k}$ ($k=1, 2, \ldots, n$) indicates the differential processing sequence, $r_{i+k}$ ($k=1, 2, \ldots, n$) indicates the received synchronization sequence within the correlation window, n is the length of the local pseudo random sequence, n is a positive integer, i+k indicates a start point of the correlation window when k is 1, i is a non-negative integer, and $\overline{r_{i+k}}$ indicates a conjugate of $r_{i+k}$.

Further, the estimation module 21 is specifically configured to:

according to $$q_{i+k} = \overline{s_k} * p_{i+k}, (k=1,2,\ldots,n) \quad (14)$$

obtain the correlation processing sequence, where $q_{i+k}$ ($k=1, 2, \ldots, n$) indicates the correlation processing sequence, $s_1, s_2, \ldots, s_n$ indicates the local pseudo random sequence, $p_{i+k}$ ($k=1, 2, \ldots, n$) indicates the differential processing sequence, n indicates the length of the local pseudo random sequence, n is a positive integer, i+k indicates a start point of the correlation window when k is 1, and i is a non-negative integer.

Further, the estimation module 21 is specifically configured to:

according to $$\text{corr}_i = \left\| \sum_{k=1}^{n} q_{i+k} \right\|^2, (k=1, 2, \ldots, n) \quad (15)$$

calculate the correlation value of the correlation processing sequence, until the peak value of the correlation value is obtained, where i starts from 0 and i increases by a step of 1;

$\text{corr}_i$ indicates the correlation value, $q_{i+k}$ ($k=1, 2, \ldots, n$) indicates the correlation processing sequence, n indicates a length of the correlation processing sequence, n is a positive integer, i+k indicates a start point of the correlation window when k is 1, and i is a non-negative integer.

Further, the estimation module 21 is further configured to: obtain a residual frequency offset estimation value of the received carrier frequency synchronization sequence according to a correlation processing sequence; and add up the integer part estimation value, the decimal part estimation value, and the residual frequency offset estimation value to obtain the frequency offset estimation value.

Further, the estimation module 21 is specifically configured to:

according to $$b = \text{angle}\left(\sum_{k=1}^{n} q_k\right) * \frac{B}{2\pi}, (k = 1, 2, \ldots, n) \quad (16)$$

obtain the residual frequency offset estimation value, where b indicates the residual frequency offset estimation value, $q_k$ indicates the correlation processing sequence, B is a system symbol rate, n indicates a length of the correlation processing sequence, n is a positive integer, and angle(x) indicates a phase of x.

In this embodiment, a transmit end generates a differential pseudo random sequence and a ZC sequence that has a specified parameter and sends the differential pseudo random sequence and the ZC sequence to a receive end, so that the receive end can perform symbol timing synchronization and frequency offset estimation according to a synchronization sequence received by the receive end, to obtain a frequency offset estimation value, thereby improving a capability of resisting a high carrier frequency offset and resistance to mobility during symbol timing synchronization and also improving accuracy of frequency offset estimation.

Figure 7:
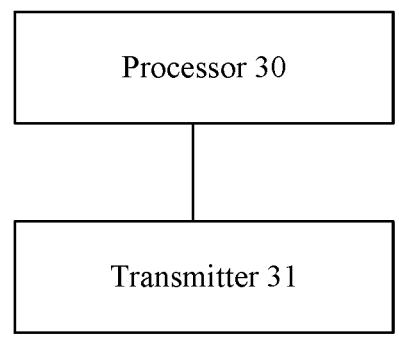
FIG. 7 is a schematic structural diagram of a transmit end according to an embodiment of the present invention.

FIG. 7 is a schematic structural diagram of a transmit end according to an embodiment of the present invention. As shown in FIG. 7, the transmit end includes: a processor 30 and a transmitter 31.

Specifically, the processor 30 is configured to generate a synchronization sequence, where the synchronization sequence includes a carrier frequency synchronization sequence, the carrier frequency synchronization sequence is $zc(m)=e^{\pm j\pi m(m+1+2q)/L}$, m=0, 1, ..., L−1, q∈Z, L indicates a length of the carrier frequency synchronization sequence, q indicates a parameter of the carrier frequency synchronization sequence, Z indicates an integer set, $e^{\pm j\pi m(m+1+2q)/L}$ indicates the $(\pm j\pi m(m+1+2q)/L)^{th}$ power of e, and e is a natural constant; the transmitter 31 is configured to send the synchronization sequence generated by the processor 30 to a receive end, so that the receive end performs frequency offset estimation according to the carrier frequency synchronization sequence, to obtain a frequency offset estimation value.

Further, the synchronization sequence generated by the foregoing processor 30 further includes a differential pseudo random sequence, where the differential pseudo random sequence is $l_i = l_{i-1} * s_{i-1}$, (i=2, 3, ..., n+1), $l_1 = \alpha$, $\{s_i\}_{i=1,\ldots,n}$ indicates a local pseudo random sequence, n indicates a length of the local pseudo random sequence, and α is a non-zero complex number, so that the receive end performs slipping processing on the synchronization sequence by using the local pseudo random sequence, to determine a correlation window corresponding to a peak value of a correlation value; and uses a start location of the correlation window as a start location of the differential pseudo random sequence.

In this embodiment, a transmit end generates a ZC sequence that has a specified parameter and sends the ZC sequence to a receive end, so that the receive end can perform frequency offset estimation according to a synchronization sequence received by the receive end, to obtain a frequency offset estimation value, thereby improving accuracy of frequency offset estimation.

Figure 8:
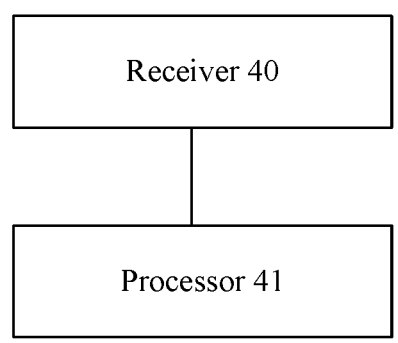
FIG. 8 is a schematic structural diagram of a receive end according to an embodiment of the present invention.

FIG. 8 is a schematic structural diagram of a receive end according to an embodiment of the present invention. As shown in FIG. 8, the receive end includes: a receiver 40 and a processor 41.

Specifically, the receiver 40 is configured to receive a synchronization sequence sent by a transmit end, where the synchronization sequence includes a carrier frequency synchronization sequence, the carrier frequency synchronization sequence is $zc(m)=e^{\pm j\pi m(m+1+2q)/L}$, m=0, 1, ..., L−1, q∈Z, L indicates a length of the carrier frequency synchronization sequence, q indicates a parameter of the carrier frequency synchronization sequence, Z indicates an integer set, $e^{\pm j\pi m(m+1+2q)/L}$ indicates the $(\pm j\pi m(m+1+2q)/L)^{th}$ power of e, and e is a natural constant; and the processor 41 is configured to perform frequency offset estimation according to the synchronization sequence received by the receiver 40, to obtain a frequency offset estimation value.

Further, the processor 41 is specifically configured to: determine a start location of the received carrier frequency synchronization sequence according to the received synchronization sequence; determine a decimal part estimation value of the frequency offset estimation value according to the received carrier frequency synchronization sequence, the start location of the received carrier frequency synchronization sequence, and a local carrier frequency synchronization sequence; perform frequency compensation on the received carrier frequency synchronization sequence according to the decimal part estimation value, to obtain a first compensation sequence; and obtain an integer part estimation value of the frequency offset estimation value according to the first compensation sequence and the local carrier frequency synchronization sequence, and determine the frequency offset estimation value.

Further, the processor 41 is specifically configured to: determine a start location of the received carrier frequency synchronization sequence according to the received synchronization sequence; determine an integer part estimation value according to the received carrier frequency synchronization sequence and a local carrier frequency synchronization sequence; perform frequency compensation on the received carrier frequency synchronization sequence according to the integer part estimation value, to obtain a second compensation sequence; and obtain a decimal part estimation value according to the second compensation sequence, the local carrier frequency synchronization sequence, and the start location of the received carrier frequency synchronization sequence, and determine the frequency offset estimation value.

Further, the processor 41 is specifically configured to: perform cross-correlation processing on the received carrier frequency synchronization sequence and the local carrier frequency synchronization sequence to obtain at least one first correlation value; determine a correlation peak location offset according to the start location of the received carrier frequency synchronization sequence and a start location of the largest correlation window corresponding to the largest value of all the first correlation values; and
according to $$f_r = pos*B/L \quad (17)$$

or $$f_r = -pos*B/L \quad (18)$$

determine the decimal part estimation value, where $f_r$ indicates the decimal part estimation value, pos indicates the correlation peak location offset, B indicates a system symbol rate, and L indicates a length of the carrier frequency synchronization sequence.

Further, the processor 41 is specifically configured to: discretize a preset estimation range by using the system symbol rate as a step, to obtain at least one discretized frequency offset value; perform frequency compensation on the first compensation sequence according to the discretized frequency offset value, to obtain at least one third compensation sequence; perform cross-correlation processing on the at least one third compensation sequence and the local carrier frequency synchronization sequence, to obtain at least one second correlation value; use, as the integer part estimation value, a discretized frequency offset value corresponding to the largest value of all the second correlation values; and add up the integer part estimation value and the decimal part estimation value to obtain the frequency offset estimation value.

Further, the processor 41 is specifically configured to: receive a differential pseudo random sequence sent by the transmit end; perform slipping processing on the received synchronization sequence by using a local pseudo random sequence, to determine a peak value correlation window corresponding to a peak value of a correlation value; use a start location of the peak value correlation window as a start location of the received differential pseudo random sequence; and determine the start location of the received carrier frequency synchronization sequence according to the start location of the received differential pseudo random sequence.

Further, the processor 41 is specifically configured to: repeat performing the following operations: perform differential processing on the received synchronization sequence within the correlation window according to a length of the local pseudo random sequence, to obtain a differential processing sequence; and perform cross-correlation processing on the local pseudo random sequence and the differential processing sequence, to obtain a correlation processing sequence, until a peak value of a correlation value of the correlation processing sequence is obtained, and a correlation window corresponding to the peak value is determined.

Further, the processor 41 is specifically configured to: according to $$p_{i+k} = \overline{r_{i+k}}*r_{i+k+1}, (k=1,2,\ldots,n) \quad (19)$$

obtain the differential processing sequence, where $p_{i+k}$ (k=1, 2, ..., n) indicates the differential processing sequence, $r_{i+k}$ (k=1, 2, ..., n) indicates the received synchronization sequence within the correlation window, n is the length of the local pseudo random sequence, n is a positive integer, i+k indicates a start point of the correlation window when k is 1, i is a non-negative integer, and $\overline{r_{i+k}}$ indicates a conjugate of $r_{i+k}$.

Further, the processor 41 is specifically configured to: according to $$q_{i+k} = \overline{s_k}*p_{i+k}, (k=1,2,\ldots,n) \quad (20)$$

obtain the correlation processing sequence, where $q_{i+k}$ (k=1, 2, ..., n) indicates the correlation processing sequence, $s_1, s_2, \ldots, s_n$ indicates the local pseudo random sequence, $p_{i+k}$ (k=1, 2, ..., n) indicates the differential processing sequence, n indicates the length of the local pseudo random sequence, n is a positive integer, i+k indicates a start point of the correlation window when k is 1, and i is a non-negative integer.

Further, the processor 41 is specifically configured to: according to $$corr_i = \left\|\sum_{k=1}^{n} q_{i+k}\right\|^2, (k = 1, 2, \ldots, n) \quad (21)$$

calculate the correlation value of the correlation processing sequence, until the peak value of the correlation value is obtained, where i starts from 0 and i increases by a step of 1;

$corr_i$ indicates the correlation value, $q_{i+k}$ (k=1, 2, ..., n) indicates the correlation processing sequence, n indicates a length of the correlation processing sequence, n is a positive integer, i+k indicates a start point of the correlation window when k is 1, and i is a non-negative integer.

Further, the processor 41 is further configured to: obtain a residual frequency offset estimation value of the received carrier frequency synchronization sequence according to a correlation processing sequence; and add up the integer part estimation value, the decimal part estimation value, and the residual frequency offset estimation value to obtain the frequency offset estimation value.

Further, the processor 41 is specifically configured to: according to $$b = \text{angle}\left(\sum_{k=1}^{n} q_k\right) * \frac{B}{2\pi}, (k = 1, 2, \ldots, n) \quad (22)$$

obtain the residual frequency offset estimation value, where b indicates the residual frequency offset estimation value, $q_k$ indicates the correlation processing sequence, B is a system symbol rate, n indicates a length of the correlation processing sequence, n is a positive integer, and angle(x) indicates a phase of x.

In this embodiment, a transmit end generates a differential pseudo random sequence and a ZC sequence that has a specified parameter and sends the differential pseudo random sequence and the ZC sequence to a receive end, so that the receive end can perform symbol timing synchronization and frequency offset estimation according to a synchronization sequence received by the receive end, to obtain a frequency offset estimation value, thereby improving a capability of resisting a high carrier frequency offset and resistance to mobility during symbol timing synchronization and also improving accuracy of frequency offset estimation.

Persons of ordinary skill in the art may understand that all or some of the steps of the method embodiments may be implemented by a program instructing relevant hardware. The program may be stored in a computer-readable storage medium. When the program runs, the steps of the method embodiments are performed. The foregoing storage medium includes: any medium that can store program code, such as a ROM, a RAM, a magnetic disk, or an optical disc.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. A synchronization signal receiving method, comprising:
   receiving, by a receiver device, a synchronization signal sent by a transmitter device, wherein the synchronization signal comprises a carrier frequency synchronization sequence, wherein the carrier frequency synchronization sequence is $zc(m) = e^{\pm j\pi m(m+1+2q)/L}$, m=0, 1, . . . , L−1, q∈Z, wherein L indicates a length of the carrier frequency synchronization sequence, q indicates a parameter of the carrier frequency synchronization sequence, Z indicates an integer set, $e^{\pm j\pi m(m+1+2q)/L}$ indicates the $(\pm j\pi m(m+1+2q)/L)^{th}$ power of e, and e is a natural constant;
   performing, by the receiver device, frequency offset estimation according to the carrier frequency synchronization sequence to obtain a frequency offset estimation value; and
   in response to the transmitter device sending another signal subsequent to the synchronization signal, performing, by the receiver device, frequency compensation on the another signal sent by the transmitter device based on the frequency offset estimation value.

2. The method according to claim 1, wherein the performing, by the receiver device, frequency offset estimation according to the synchronization signal, to obtain the frequency offset estimation value comprises:
   determining, by the receiver device, a start location of the carrier frequency synchronization sequence according to the synchronization signal;
   determining, by the receiver device, a decimal part estimation value of the frequency offset estimation value according to the carrier frequency synchronization sequence, the start location of the carrier frequency synchronization sequence, and a local carrier frequency synchronization sequence;
   performing, by the receiver device, frequency compensation on the carrier frequency synchronization sequence according to the decimal part estimation value, to obtain a first compensation sequence;
   obtaining, by the receiver device, an integer part estimation value of the frequency offset estimation value according to the first compensation sequence and the local carrier frequency synchronization sequence; and
   determining the frequency offset estimation value according to the decimal part estimation value and the integer part estimation value.

3. The method according to claim 1, wherein the performing, by the receiver device, frequency offset estimation according to the synchronization signal, to obtain the frequency offset estimation value comprises:
   determining, by the receiver device, a start location of the carrier frequency synchronization sequence according to the synchronization signal;
   determining, by the receiver device, an integer part estimation value according to the carrier frequency synchronization sequence and a local carrier frequency synchronization sequence;
   performing, by the receiver device, frequency compensation on the carrier frequency synchronization sequence according to the integer part estimation value, to obtain a second compensation sequence;
   obtaining, by the receiver device, a decimal part estimation value according to the second compensation sequence, the local carrier frequency synchronization sequence, and the start location of the carrier frequency synchronization sequence; and
   determining the frequency offset estimation value according to the decimal part estimation value and the integer part estimation value.

4. The method according to claim 2, wherein the determining, by the receiver device, the decimal part estimation value of the frequency offset estimation value according to the carrier frequency synchronization sequence, the start location of the carrier frequency synchronization sequence, and the local carrier frequency synchronization sequence comprises:

performing, by the receiver device, cross-correlation processing on the carrier frequency synchronization sequence and the local carrier frequency synchronization sequence to obtain at least one first correlation value;

determining, by the receiver device, a correlation peak location offset according to the start location of the carrier frequency synchronization sequence and a start location of the largest correlation window corresponding to the largest value of the at least one first correlation value; and determining, by the receiver device according to $$f_r = pos*B/L$$

or $$f_r = -pos*B/L$$

the decimal part estimation value, wherein $f_r$ indicates the decimal part estimation value, pos indicates the correlation peak location offset, B indicates a system symbol rate, and L indicates a length of the carrier frequency synchronization sequence.

5. The method according to claim 2, wherein the obtaining, by the receiver device, the integer part estimation value of the frequency offset estimation value according to the first compensation sequence and the local carrier frequency synchronization sequence, and determining the frequency offset estimation value comprises:

discretizing, by the receiver device, a preset estimation range using a system symbol rate as a step, to obtain at least one discretized frequency offset value;

performing, by the receiver device, frequency compensation on the first compensation sequence according to the at least one discretized frequency offset value, to obtain at least one third compensation sequence;

performing, by the receiver device, cross-correlation processing on the at least one third compensation sequence and the local carrier frequency synchronization sequence, to obtain at least one second correlation value; and using, by the receiver device as the integer part estimation value, a discretized frequency offset value corresponding to the largest value of the at least one second correlation value;

wherein the determining, by the receiver device, the frequency offset estimation value comprises summing, by the receiver device, the integer part estimation value and the decimal part estimation value to obtain the frequency offset estimation value.

6. The method according to claim 2, wherein the determining, by the receiver device, the start location of the carrier frequency synchronization sequence according to the synchronization signal comprises:

receiving, by the receiver device, a differential pseudo random sequence sent by the transmitter device;

performing, by the receiver device, slipping processing on the synchronization signal using a local pseudo random sequence, to determine a peak value correlation window corresponding to a peak value of a correlation value;

using, by the receiver device, a start location of the peak value correlation window as a start location of the differential pseudo random sequence; and determining, by the receiver device, the start location of the carrier frequency synchronization sequence according to the start location of the differential pseudo random sequence.

7. The method according to claim 6, wherein the performing, by the receiver device, slipping processing on the synchronization signal using the local pseudo random sequence, to determine the peak value correlation window corresponding to the peak value of the correlation value comprises:

repeating, by the receiver device, performing the following operations: performing differential processing on the synchronization signal within the correlation window according to a length of the local pseudo random sequence, to obtain a differential processing sequence; and performing cross-correlation processing on the local pseudo random sequence and the differential processing sequence to obtain a correlation processing sequence, until a peak value of a correlation value of the correlation processing sequence is obtained, and a correlation window corresponding to the peak value is determined.

8. The method according to claim 7, wherein the performing, by the receiver device, differential processing on the synchronization signal within the correlation window according to the length of the local pseudo random sequence, to obtain the differential processing sequence comprises:

obtaining, by the receiver device, according to $$p_{i+k} = \overline{r_{i+k}} * r_{i+k+1}, (k=1,2,\ldots,n)$$

the differential processing sequence, wherein $p_{i+k}$ (k=1, 2, ..., n) indicates the differential processing sequence, $r_{i+k}$ (k=1, 2, ..., n) indicates the synchronization signal within the correlation window, n is a length of the local pseudo random sequence, n is a positive integer, i+k indicates a start point of the correlation window when k is 1, i is a non-negative integer, and $\overline{r_{i+k}}$ indicates a conjugate of $r_{i+k}$.

9. A synchronization signal sending method, comprising:

generating, by a transmitter device, a synchronization signal, wherein the synchronization signal comprises a carrier frequency synchronization sequence, wherein the carrier frequency synchronization sequence is $zc(m) = e^{\pm j\pi m(m+1+2q)/L}$, m=0, 1, ..., L−1, q∈Z, L wherein L indicates a length of the carrier frequency synchronization sequence, q indicates a parameter of the carrier frequency synchronization sequence, Z indicates an integer set, $e^{\pm j\pi m(m+1+2q)/L}$ indicates the (±jπm (m+1+2q)/L)$^{th}$ power of e, and e is a natural constant;

sending, by the transmitter device, the synchronization signal to a receiver device, to enable the receiver device to perform frequency offset estimation according to the carrier frequency synchronization sequence and to obtain a frequency offset estimation value; and sending, by the transmitter device, another signal subsequent to the synchronization signal to the receiver device, wherein the receiver device performs frequency compensation on the another signal sent by the transmitter device based on the frequency offset estimation value.

10. The method according to claim 9, wherein the synchronization signal further comprises a differential pseudo random sequence, wherein the differential pseudo random sequence is $l_i = l_{i-1} * s_{i-1}$, (i=2, 3, ..., n+1), $l_1 = \alpha$, $\{s_i\}_{i=1,\ldots,n}$ indicates a local pseudo random sequence, n indicates a length of the local pseudo random sequence, and α is a non-zero complex number, to enable the receiver device to perform slipping processing on the synchronization signal using the local pseudo random sequence, to determine a correlation window corresponding to a peak value of a correlation value, and to use a start location of the correlation window as a start location of the differential pseudo random sequence.

11. An apparatus, receive end, comprising:
a receiver device, configured to receive a synchronization signal sent by a transmitter device, wherein the synchronization signal comprises a carrier frequency synchronization sequence, wherein the carrier frequency synchronization sequence is $zc(m)=e^{\pm j\pi m(m+1+2q)/L}$, $m=0, 1, \ldots, L-1$, $q \in Z$, wherein L indicates a length of the carrier frequency synchronization sequence, q indicates a parameter of the carrier frequency synchronization sequence, Z indicates an integer set, $e^{\pm j\pi m(m+1+2q)/L}$ indicates the $(\pm j\pi m(m+1+2q)/L)^{th}$ power of e, and e is a natural constant; and
a processor, configured to perform frequency offset estimation according to the carrier frequency synchronization sequence to obtain a frequency offset estimation value;
wherein in response to the receiver device receiving another signal subsequent to the synchronization signal from the transmitter device, the processor is configured to perform frequency compensation on the another signal sent by the transmitter device based on the frequency offset estimation value.

12. The apparatus according to claim 11, wherein the processor is configured to:
determine a start location of the carrier frequency synchronization sequence according to the synchronization signal;
determine a decimal part estimation value of the frequency offset estimation value according to the carrier frequency synchronization sequence, the start location of the carrier frequency synchronization sequence, and a local carrier frequency synchronization sequence;
perform frequency compensation on the carrier frequency synchronization sequence according to the decimal part estimation value, to obtain a first compensation sequence;
obtain an integer part estimation value of the frequency offset estimation value according to the first compensation sequence and the local carrier frequency synchronization sequence; and
determine the frequency offset estimation value according to the decimal part estimation value and the integer part estimation value.

13. The apparatus according to claim 11, wherein the processor is configured to:
determine a start location of the carrier frequency synchronization sequence according to the synchronization signal;
determine an integer part estimation value according to the carrier frequency synchronization sequence and a local carrier frequency synchronization sequence;
perform frequency compensation on the carrier frequency synchronization sequence according to the integer part estimation value, to obtain a second compensation sequence;
obtain a decimal part estimation value according to the second compensation sequence, the local carrier frequency synchronization sequence, and the start location of the carrier frequency synchronization sequence; and
determine the frequency offset estimation value according to the decimal part estimation value and the integer part estimation value.

14. The apparatus according to claim 12, wherein the processor is configured to:
perform cross-correlation processing on the carrier frequency synchronization sequence and the local carrier frequency synchronization sequence to obtain at least one first correlation value;
determine the correlation peak location offset according to the start location of the carrier frequency synchronization sequence and a start location of the largest correlation window corresponding to the largest value of the at least one first correlation value; and
determine according to $$f_r = pos*B/L$$

or $$f_r = -pos*B/L$$

the decimal part estimation value,
wherein $f_r$ indicates the decimal part estimation value, pos indicates the correlation peak location offset, B indicates a system symbol rate, and L indicates a length of the carrier frequency synchronization sequence.

15. The apparatus according to claim 12, wherein the processor is configured to:
discretize a preset estimation range by using a system symbol rate as a step, to obtain at least one discretized frequency offset value;
perform frequency compensation on the first compensation sequence according to the at least one discretized frequency offset value, to obtain at least one third compensation sequence;
perform cross-correlation processing on the at least one third compensation sequence and the local carrier frequency synchronization sequence to obtain at least one second correlation value;
use, as the integer part estimation value, a discretized frequency offset value corresponding to the largest value of the at least one second correlation value; and
sum the integer part estimation value and the decimal part estimation value to obtain the frequency offset estimation value.

16. The apparatus according to claim 12, wherein the processor is configured to:
receive a differential pseudo random sequence from the transmitter device;
perform slipping processing on the synchronization signal using a local pseudo random sequence, to determine a peak value correlation window corresponding to a peak value of a correlation value;
use a start location of the peak value correlation window as a start location of the differential pseudo random sequence; and
determine the start location of the carrier frequency synchronization sequence according to the start location of the differential pseudo random sequence.

17. The apparatus according to claim 16, wherein the processor is configured to:
repeat performing the following operations: perform differential processing on the synchronization signal within the correlation window according to a length of the local pseudo random sequence, to obtain a differential processing sequence; and perform cross-correlation processing on the local pseudo random sequence and the differential processing sequence, to obtain a correlation processing sequence, until a peak value of a correlation value of the correlation processing sequence is obtained, and a correlation window corresponding to the peak value is determined.

18. The apparatus according to claim 17, wherein the processor is configured to:

obtain according to $$p_{i+k} = \overline{r_{i+k}} * r_{i+k+1}, (k=1,2,\ldots,n)$$

the differential processing sequence, wherein $p_{i+k}$ (k=1, 2, . . . , n) indicates the differential processing sequence, $r_{i+k}$ (k=1, 2, . . . , n) indicates the synchronization signal within the correlation window, n is the length of the local pseudo random sequence, n is a positive integer, i+k indicates a start point of the correlation window when k is 1, i is a non-negative integer, and $\overline{r_{i+k}}$ indicates a conjugate of $r_{i+k}$.

19. An apparatus, comprising:

a processor, configured to generate a synchronization signal, wherein the synchronization signal comprises a carrier frequency synchronization sequence, wherein the carrier frequency synchronization sequence is $zc(m) = e^{\pm j\pi m(m+1+2q)/L}$, m=0, 1, . . . , L−1, q∈Z, wherein L indicates a length of the carrier frequency synchronization sequence, q indicates a parameter of the carrier frequency synchronization sequence, Z indicates an integer set, $e^{\pm j\pi m(m+1+2q)/L}$ indicates the (±jπm(m+1+2q)/L)$^{th}$ power of e, and e is a natural constant; and a transmitter, configured to:

send the synchronization signal generated by the processor to a receiver device, to enable the receiver device to perform frequency offset estimation according to the carrier frequency synchronization sequence, and to obtain a frequency offset estimation value, and send another signal subsequent to the synchronization signal to the receiver device, wherein the receiver device performs frequency compensation on the another signal based on the frequency offset estimation value.

20. The apparatus according to claim 19, wherein the synchronization signal generated by the processor further comprises a differential pseudo random sequence, wherein the differential pseudo random sequence is $l_i = l_{i-1} * s_{i-1}$, (i=2, 3, . . . , n+1), $l_1 = \alpha$, $\{s_i\}_{i=1, \ldots, n}$ indicates a local pseudo random sequence, n indicates a length of the local pseudo random sequence, and α is a non-zero complex number, to enable the receiver device to perform slipping processing on the synchronization signal using the local pseudo random sequence, to determine a correlation window corresponding to a peak value of a correlation value, and to use a start location of the correlation window as a start location of the differential pseudo random sequence.

* * * * *